(12) United States Patent
Tamura et al.

(10) Patent No.: US 6,496,278 B1
(45) Date of Patent: Dec. 17, 2002

(54) IMAGE FORMING APPARATUS AND PRINTER APPARATUS

(75) Inventors: Noboru Tamura, Kanagawa; Satoshi Miyazaki, Tokyo, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/452,522

(22) Filed: Dec. 1, 1999

(30) Foreign Application Priority Data

Dec. 2, 1998 (JP) ............................................ 10-358422
Dec. 9, 1998 (JP) ............................................ 10-368517

(51) Int. Cl.⁷ .............................................. G06F 12/00
(52) U.S. Cl. .................... 358/1.16; 358/1.12; 358/1.17; 358/1.18; 382/296; 382/297; 399/403; 399/404
(58) Field of Search ............................... 358/1.16, 1.12, 358/1.17, 1.18; 399/403, 404; 382/296, 297

(56) References Cited

U.S. PATENT DOCUMENTS

| | | | | |
|---|---|---|---|---|
| 5,239,388 A | * | 8/1993 | Matsumoto | 358/296 |
| 5,627,650 A | * | 5/1997 | Nosaki et al. | 358/296 |
| 5,895,142 A | * | 4/1999 | Takahashi et al. | 358/401 |

* cited by examiner

*Primary Examiner*—Edward Coles
*Assistant Examiner*—Alan Rahimi
(74) *Attorney, Agent, or Firm*—Cooper & Dunham LLP

(57) ABSTRACT

When a storage memory becomes full during processing of printing out of image data read from a page memory and transferred to both a storage memory and a printing portion at the same time for a first copy, a function of an image rotating portion is not effected for copies subsequent to the first copy, and, also, for pages of image data which are stored in the storage memory are printed out, and a page of image data processed at the time the storage memory became full is transferred from the page memory to the printing portion and is printed out.

7 Claims, 22 Drawing Sheets

| PAGE IMAGE NUMBER | 1 |
|---|---|
| PAPER-FEEDING TRAY | TRAY 2 |
| PAPER-EJECTION TRAY | TRAY 1 |

| 1 | PAGE INFORMATION 1 |
|---|---|
| 2 | PAGE INFORMATION 2 |
| --- | --- |
| n | PAGE INFORMATION n |

IMAGE FORMING APPARATUS AND PRINTER APPARATUS

BACKGROUND OF THE INVENTION

1. Field of the Invention

The present invention relates to an image forming apparatus such as a printer apparatus, a digital copier, having an electronic-sorting function, a composite machine having functions of these apparatuses and also a facsimile function, or the like.

2. Description of the Related Art

A digital copier, a printer apparatus or the like has a storage memory for storing input image data therein, and can selectively read the image data from the storage memory and output it.

Such an image forming apparatus can perform various functions such as: a continuous copying function of repeatedly reading the same image data and copying a plurality of sheets of the same image continuously; a so-called electronic-sorting function of storing in a image memory a plurality of pages of image data input from a high-order apparatus or a scanner, controlling an order of reading the image data from the storing memory and performing printing operations so as to perform sorting not using any mechanical sorting function; and a function of rotating or changing in size of the image data read from the storing memory so as to output an image in a condition different from that of the original image. Further, it is also possible to perform these functions combinationally.

For example, when a document consisting of a plurality of pages is printed so as to obtain a plurality of collated copies of the document, it is possible to perform sorting printing, as shown in FIG. 1, for example, so that the separation between adjacent copies can be easily recognized, by rotating image data for each copy. FIG. 1 shows a case where a document consisting of 10 pages is printed so as to obtain four continuous collated copies of the document. (In this case, the image data is rotated for each copy. However, it is also possible that the image data is not rotated for each copy. In this case, the four collated copies of the document are output continuously, as shown in FIG. 1, but the orientations of all the sheets are the same as each other. Such sorting is called electronic sorting. That is, in electronic-sorting printing for obtaining n copies of a document consisting of m pages, m pages for the first copy are output in sequence, m pages for the second copy are output in sequence, m pages for the third copy are output in sequence, . . . . and, then, m pages for the n-th copy are output in sequence. The example shown in FIG. 1 is obtained as a result of combining electronic sorting and rotation sorting.) In the case of FIG. 1, for the first copy, the image data is input to the storage memory and to a printing portion at the same time. For the copies subsequent to the first copy, the image data is input from the storage memory to the printing portion. The rotation of the image data is performed at the same time only for the even-numbered copies, and printing of the image data is performed on a paper sheet having the orientation corresponding to the thus-rotated image data. Thus, by ejecting copies in a manner in which orientations of the copies are changed alternately for each copy, it is possible to reduce a sorting work performed by human hands.

In such a kind of image forming apparatus, when image data is stored in a storage memory, the image data developed in a page memory is compressed and stored as code data, generally. However, because the capacity of the storage memory is limited, there may be a case of occurrence of a memory-full condition where it is not possible to store all the pages of input image data in the storage memory depending on a type (character data, image data, graphic data, or the like) of the image data and the number of pages.

For example, a case of a copier, when an original document consisting of a plurality of pages is read in sequence and printing is performed such as to obtain a plurality of collated copies of the document, will now be considered. In this case, read image data is developed in a page memory in sequence, and, then, the image data is sent to a storage memory and a printing portion at the same time. However, when the storage memory enters a memory-full condition while the original document is being read, all the pages are not printed out for the first copy. At this time, the last printed-out page of image data is only sent to the printing portion, but is not stored in the storage memory.

When the data in the storage memory is cancelled in this case, printing for the copies subsequent to the first copy is not performed at all and the printing is stopped. Therefore, it is necessary for an operator to again perform all the operations and settings for reading the original document.

Further, when printing for the copies subsequent to the first copy is performed using only the pages of the image data which were stored in the storage memory (such a kind of printing is called forcible printing), because a number of pages of the image data which can be read from the storage memory is one less than the number of pages which were printed for the first copy, the number of pages printed for the first copy is different from the number of pages printed for each of the copies subsequent to the first copy. That is, for the first copy, the page which was being developed in the page memory at the time the storage memory entered the memory-full condition can be printed. However, because this page of image data is not stored in the storage memory, this page of image data is not printed for the copies subsequent to the first copy.

Therefore, to solve the problem, the image data for the pages which are stored in the storage memory, may be sent to the printing portion and be printed out, and, then, the image data for the page being processed at the time the storage memory became full, may be sent to the printing portion from the page memory directly and be printed out.

However, because, normally, an image rotating portion is placed between the storage memory and printing portion, when the image data is sent to the printing portion from the page memory to the printing portion directly without passing through the storage memory, this image data cannot be rotated. As a result, for example, as shown in FIG. 2, sorting is not performed correctly.

The example of FIG. 2 shows a case where, when a document consisting of 10 pages is attempted to be printed so as to obtain four continuous collated copies of the document through a combination of electronic sorting and rotation sorting, the storage memory becomes full during the sixth page of image data being stored there. In this case, when forcible printing for the copies subsequent to the first copy is attempted to be performed using only the image data stored in the storage memory, the last page (in this example, the sixth page) which was printed for the first copy is not printed. Therefore, the image data for the pages (in this example, the first page through fifth page) which are stored in the storage memory, is sent to the printing portion without emptying the page memory until the printing for the specified copies (in this example, four copies) is finished, and, after the image data for the last page (in this example, the fifth page) of each copy is printed out, the image data for the subsequent page (in this example, the sixth page) stored in the page memory is sent to the printing portion directly and is printed out.

However, because the image data from the page memory does not pass through the image rotating portion, it is not possible to perform rotating processing on this image data. As a result, when the rotating processing is performed on the image data from the storage memory, sorting is performed in erroneous units, as shown in FIG. 2. In this case, it is necessary for an operator to again perform sorting manually. Therefore, in comparison to a case where only electronic sorting is performed but rotation sorting is not performed, the operator must perform a troublesome work.

In order to prevent such a problematic situation from occurring, the image rotating portion may be provided before the storage memory. However, if so, it is necessary to store two kinds of image data, one before rotation and the other after rotation, for the same page. Therefore, it is necessary to double the capacity of the storage memory, resulting in a big increase in the costs.

In electronic-sorting printing in the related art, when a plurality of copies are obtained through printing, there is a case where, after an operator confirms that printing for the first copy has been correctly performed (test printing), the operator inputs instructions through an operation panel to start printing for a necessary number of copies. In this case, a printer apparatus waits for instructions by the operator to start printing for copies subsequent to the first copy.

Further, when a host computer gives a subsequent printing request (second printing job) to the printing apparatus which is in the condition of waiting for instructions to start printing of copies subsequent to the first copy after performing printing for the first copy as test printing (first printing job), the host computer must wait because the printer apparatus does not receive the subsequent printing request (second printing job).

Further, when an operator gives a subsequent printing request (second printing job) to the printing apparatus which is in the condition of waiting for instructions to start printing of copies subsequent to the first copy after performing printing for the first copy as test printing (first printing job), the operator must wait because the printer apparatus does not receive the subsequent printing request (second printing job).

Further, when test printing is set in the subsequent printing request (second printing job) given to the printing apparatus which is in the condition of waiting for instructions to start printing of copies subsequent to the first copy after performing printing for the first copy as test printing (first printing job), the host computer and operator must wait because the printer apparatus does not receive the subsequent printing request (second printing job).

Further, when a subsequent printing (second printing job) is performed by the printing apparatus which is in the condition of waiting for instructions to start printing of copies subsequent to the first copy after performing printing for the first copy as test printing (first printing job), the subsequent printing (second printing job) is performed between the printing of the first copy and the printing of the second copy (first printing job), and, thereby, the printing is mixed.

SUMMARY OF THE INVENTION

An object of the present invention is to provide an image forming apparatus having functions such that, even when a storage memory becomes full during storing of image data when a document consisting of a plurality of pages is attempted to be printed to obtain a plurality of collated copies of the document using a combination of electronic sorting and rotation sorting, printing processing for the specified copies can be performed completely, and, also, sorting in erroneous units can be prevented.

Another object of the present invention is to provide a printer apparatus which, when receiving a printing request (second printing job) while waiting for instructions to start printing of copies subsequent to a first copy after performing printing for the first copy as test printing (first printing job), performs page development and storage of a page image corresponding to the printing request (second printing job). Thereby, it is not necessary for a host computer to wait. Further, when a paper-ejection destination of a printing request (second printing job) is different from that of preceding printing (first printing job), the printer apparatus receives the printing request (second printing job) so as to perform printing. Thereby, it is not necessary for an operator to wait. Further, when test printing is set in a second printing job, the printer apparatus gives priority thereto so as to perform the printing (second printing job). Thus, the printer apparatus does not have the operator waiting.

In order to solve the above-mentioned problems, an image forming apparatus according to the present invention, comprises:

a data developing portion which develops image data in a predetermined format from input data;

a page memory which stores therein the image data in a page unit developed by the data developing portion;

a storage memory which stores therein the image data read from the page memory;

an image compressing portion which compresses the image data when the image data is input to the storage memory;

an image decompressing portion which decompresses the compressed image data when the image data is output from the storage memory;

an image rotating portion which rotates the image data from the image decompressing portion, and, then, outputs the image data; and a printer portion which prints an image in accordance with the image data read from the page memory or the storage memory, wherein the input image data for a plurality of pages is stored in the storage memory, a reading order of the image data from the storage memory is controlled, and, also, the image data is printed out after being rotated (relatively 90°, this being the same hereinafter) alternately in copy units, so that sorting printing can be performed such that a separation between adjacent copies can be easily determined (that is, an electronic-sorting and rotation-sorting printing can be performed), wherein:

the apparatus further comprises a distribution/switching portion which transfers the image data read from the page memory to only either one of the storage memory and the printing portion or to both portions; and when the storage memory becomes full during processing of printing out of the image data read from the page memory and transferred to both the storage memory and the printing portion at the same time for a first copy, the function of the image rotating portion is caused to not be effected for copies subsequent to the first copy, and, also, the pages of image data which are stored in the storage memory are printed out, and, the page of image data processed at the time the storage memory became full is transferred from the page memory to the printing portion and is printed out.

In this arrangement, the rotation sorting is performed only when storage of image data in the storage memory has been normally completed. When forcible printing is performed for copies subsequent to a first copy, the function of the image rotating portion is caused to be not effected, and, also, the pages of image data which are stored in the storage memory are printed out, and, the page of image data processed at the time the storage memory became full, this page being not able to be rotated, is transferred from the page memory to the printing portion and is printed out. As a result, although the boundary between adjacent collated copies cannot be recognized, it is possible to perform printing processing for a specified number of copies to the end, and, also, to prevent sorting from being performed in erroneous units.

An image forming apparatus according to another aspect of the present invention, comprises:
- a data developing portion which develops image data in a predetermined format from input data;
- a page memory which stores therein the image data in a page unit developed by the data developing portion;
- a storage memory which stores therein the image data read from the page memory;
- an image compressing portion which compresses the image data when the image data is input to the storage memory;
- an image decompressing portion which decompresses the compressed image data when the image data is output from the storage memory;
- an image rotating portion which rotates the image data from the image decompressing portion, and, then, outputs the image data; and
- a printer portion which prints an image in accordance with the image data read from the page memory or the storage memory, wherein the input image data for a plurality of pages is stored in the storage memory, a reading order of the image data from the storage memory is controlled, and, also, the image data is printed after being rotated alternately in copy units, so that sorting printing can be performed such that a separation between adjacent copies can be easily determined (that is, the electronic-sorting and rotation-sorting printing can be performed), wherein:
- the apparatus further comprises a distribution/switching portion which transfers the image data read from the page memory only to either one of the storage memory and the printing portion or to both portions; and
- when the storage memory becomes full during processing of printing out of the image data read from the page memory and transferred to both the storage memory and the printing portion at the same time for a first copy, the page of image data processed at the time the storage memory became full is transferred from the page memory to the printing portion and is printed out for necessary copies after printing out for the first copy is finished, and, then, the image data stored in the storage memory is used to be printed out for copies subsequent to the first copy.

In this arrangement, when the storage memory has become full, before forcible printing for the copies subsequent to the first copy is performed, the image data stored in the page memory, on which data the rotation processing cannot be performed, is input to the printing portion and is printed out for the necessary number of copies. In this case, the sheets on each of which the image data read from the page memory has been printed out should be interleaved at predetermined positions later manually. However, the boundary between adjacent copies can be clearly recognized, and, also, the printing processing for the specified number of copies can be performed to the end. Therefore, it is possible to reduce a sorting work by human hands.

An image forming apparatus according to another aspect of the present invention, comprises:
- a data developing portion which develops image data in a predetermined format from input data;
- a page memory which stores therein the image data in a page unit developed by the data developing portion;
- a storage memory which stores therein the image data read from the page memory;
- an image compressing portion which compresses the image data when the image data is input to the storage memory;
- an image decompressing portion which decompresses the compressed image data when the image data is output from the storage memory;
- an image rotating portion which rotates the image data from the image decompressing portion, and, then, outputs the image data; and
- a printer portion which prints an image in accordance with the image data read from the page memory or the storage memory, wherein the input image data for a plurality of pages is stored in the storage memory, a reading order of the image data from the storage memory is controlled, and, also, the image data is printed after being rotated alternately in copy units, so that sorting printing can be performed such that a separation between adjacent copies can be easily determined (that is, the electronic-sorting and rotation-sorting printing can be performed), wherein:
- the apparatus further comprises a distribution/switching portion which transfers the image data read from the page memory to only either one of the storage memory and the printing portion or to both portions, and a plurality of paper ejecting trays; and
- when the storage memory becomes full during processing of printing out of the image data read from the page memory and transferred to both the storage memory and the printing portion at the same time for a first copy, the page of image data processed at the time the storage memory became full is transferred from the page memory to the printing portion and printed out, after the printing out for the first copy is finished, on sheets which are ejected to one of the plurality of paper-ejection trays, and the image data stored in the storage memory is used to be printed out for copies subsequent to the first copy on sheets which are ejected to another one of the plurality of paper-ejecting trays.

In this arrangement, when the storage memory has become full, each sheet on which the image data has been printed out, which data has been stored in the page memory, and on which data the rotation processing cannot be performed at the time of forcible printing for the copies subsequent to the first copy, is ejected to the paper-ejection tray different from the paper-ejection tray to which the other sheets are ejected. In this case, the sheets on each of which the image data read from the page memory has been printed out should be interleaved at predetermined positions later manually. However, the boundary between adjacent copies can be clearly recognized, and, also, the printing processing for the specified number of copies can be performed to the end. Therefore, it is possible to reduce a sorting work by human hands.

An image forming apparatus according to another aspect of the present invention, comprises:

a data developing portion which develops image data in a predetermined format from input data;

a page memory which stores therein the image data in a page unit developed by the data developing portion;

a storage memory which stores therein the image data read from the page memory;

an image compressing portion which compresses the image data when the image data is input to the the storage memory;

an image decompressing portion which decompresses the compressed image data when the image data is output from the storage memory;

an image rotating portion which rotates the image data from the image decompressing portion, and, then, outputs the image data; and a printer portion which prints an image in accordance with the image data read from the page memory or the storage memory, wherein the input image data for a plurality of pages is stored in the storage memory, a reading order of the image data from the storage memory is controlled, and, also, the image data is printed after being rotated alternately in copy units, so that sorting printing can be performed such that a separation between adjacent copies can be easily determined (that is, the electronic-sorting and rotation-sorting printing can be performed), wherein:

the apparatus further comprises a distribution/switching portion which transfers the image data read from the page memory only to either one of the storage memory and the printing portion or to both portions; and when the storage memory becomes full during processing of printing out of the image data read from the page memory and transferred to both the storage memory and the printing portion at the same time for a first copy, all the pages of image data which are stored in the storage memory are rotated and printed out, and the page of image data processed at the time the storage memory became full is transferred from the page memory to the printing portion and printed out, for copies subsequent to the first copy.

In this arrangement, when the storage memory has become full, all the image data stored in the storage memory is rotated and is printed out in the forcible printing for the copies subsequent to the first copy. In this case, the page data, read from the page memory, on which data the rotation processing cannot be performed, is printed out, and the-thus-obtained copies of the page act as boundaries. As a result, it is possible to more clearly recognize the boundary between adjacent copies. Thereby, it is possible to reduce a sorting work by human hands.

The image forming apparatus may further comprises a plurality of paper-ejection trays, and sheets on which are printed, respectively, pages of image data from a first page of image data through a page of image data processed at the time the storage memory became full may be ejected to one of the plurality of paper-ejection trays, and sheets on which subsequent pages of image data are respectively printed may be ejected to another one of the plurality of paper-ejection trays.

In this arrangement, when the storage memory has become full, all the image data stored in the storage memory is rotated and is printed out in forcible printing for the copies subsequent to the first copy, and, also, the sheets on which the incomplete sets of pages of the image data printed out in the forcible printing for the copies subsequent to the first copy has been printed out are ejected to a destination (paper-ejection tray) and the sheets on which the remaining pages of the image data has been printed out are ejected to a different destination (paper-ejection tray). In this case, the page data, read from the page memory, on which data the rotation processing cannot be performed, is printed out, and the-thus-obtained copies of the page act as boundaries. Also, it is possible to more clearly recognize the boundary between the incomplete sets of pages printed out through the forcible printing for the copies subsequent to the first copy and the following pages (the rest). Thereby, it is possible to reduce a sorting work by human hands.

An image forming apparatus according to another aspect of the present invention, comprises:

a data developing portion which develops image data in a predetermined format from input data;

a page memory which stores therein the image data in a page unit developed by the data developing portion;

a storage memory which stores therein the image data read from the page memory;

an image compressing portion which compresses the image data when the image data is input to the the storage memory;

an image decompressing portion which decompresses the compressed image data when the image data is output from the storage memory;

an image rotating portion which rotates the image data from the image decompressing portion, and, then, outputs the image data; and a printer portion which prints an image in accordance with the image data read from the page memory or the storage memory, wherein the input image data for a plurality of pages is stored in the storage memory, a reading order of the image data from the storage memory is controlled, and, also, the image data is printed after being rotated alternately in copy units, so that sorting printing can be performed such that a separation between adjacent copies can be easily determined (that is, the electronic-sorting and rotation-sorting printing can be performed), wherein:

the apparatus further comprises a distribution/switching portion which transfers the image data read from the page memory to only either one of the storage memory and the printing portion or to both portions; and when the storage memory becomes full during processing of printing out of the image data read from the page memory and transferred to both the storage memory and the printing portion at the same time for a first copy, the pages of image data which are stored in the storage memory are printed out for a necessary number of copies after printing out for the first copy is finished, and, then, the page of image data processed at the time the storage memory became full is transferred from the page memory to the storage memory and stored there, and is printed out when remaining pages of image data are printed out for copies subsequent to the first copy.

In this arrangement, when the storage memory has become full, after the printing out of the pages of image data which are stored in the storage memory is performed for the necessary number of copies (the forcible printing for the copies subsequent to the first copy) the printing out for the first copy has been finished, the image data, which data is read from the page memory, and on which data the image rotating processing cannot be performed, is transferred to, from the page memory, and stored in the storage memory. Then, when the remaining pages of image data are printed out, the page of image data, thus transferred to and stored in the storage memory is printed out at the time of printing out of the remaining pages for each of the copies subsequent to the first copy. In this case, although the number of pages printed for the first copy before the forcible printing is different, by one, from the number of pages forcibly printed for each of the copies subsequent to the first copy, sorting for the respective copies can be performed only by laying the incomplete set of pages of the first copy on top of the remaining pages of the first copy, the incomplete set of pages of the second copy on top of the remaining pages of the second copy, . . . . Thereby, it is possible to further reduce a sorting work by human hands.

After the pages of image data which are stored in the storage memory are printed out for the necessary number of copies after printing out for the first copy is finished, it may be determined whether or not the last page of the thus-printed pages has been rotated, and, when the last page of the thus-printed pages has not been rotated, the remaining pages of image data may be rotated and printed out for the first copy, and, in response thereto, the remaining pages of image data may be rotated or may not be rotated and printed out for each of copies subsequent to the first copy so that rotation and non-rotation of the remaining pages of image data are alternately performed for the copies including the first copy in copy units.

Here, 'rotation' means relatively rotating a predetermined angle sheets between adjacent copies. Normally, the rotation angle is 90° (right angle), and, in this case, the orientations of sheets on which image data has been printed out and ejected are alternately changed, that is, to be vertical, horizontal, vertical, horizontal, . . . , in copy units In this arrangement, when the storage memory has become full, after the printing out of the pages of image data which are stored in the storage memory is performed for the necessary number of copies after the printing out for the first copy has been finished, it is determined whether or not the last page of the thus-printed-out pages has been rotated. When the last page of the printed-out pages has not been rotated, the image data of the remaining pages for the first copy is rotated, and, then, in response thereto, the image data of the remaining pages for the copies subsequent to the first copy is rotated or is not rotated in copy units alternately, that is, the image data of the remaining pages for the second copy is not rotated, the image data of the remaining pages for the third copy is rotated, the image data of the remaining pages for the fourth copy is not rotated, . . . . As a result, by determining whether or not the last page of pages printed out through forcible printing has been rotated, and, printing out the remaining pages after rotating or not rotating alternately in copy units in accordance with the result of the determination, it is possible to clearly recognize the boundary between the sheets of copies formed through forcible printing and the sheets of copies of the remaining pages without changing a paper-ejection tray. Thereby, it is possible to further reduce a sorting work by human hands.

A printer apparatus according to another aspect of the present invention, which has an electronic-sorting function and performs printing using image data, comprises:

a subsequent print request receiving portion which receives a subsequent print request when instructions to start printing for a second copy in electronic-sorting printing are waited for; and a page image storing portion which performs page development of image data of the received print request and stores the thus-obtained page image.

In this arrangement, a subsequent print request is received in a condition where instructions to start printing for a second copy in electronic-sorting printing are waited for (after printing for the first copy has been performed as test printing), and page development and page storage of print data of the thus-received print request are performed. Thereby, it is not necessary for a host computer which has attempted to transmit the print request to the printer apparatus to wait.

The printer apparatus may further comprises a paper-ejection destination determining portion which determines a paper-ejection destination of the print request in the case where the print request is received when the instructions to start printing for the second copy in the electronic-sorting printing are waited for (after printing for the first copy has been performed as test printing).

The printer apparatus may further comprises a non-same paper-ejection destination print request printing portion which performs printing of the print request in a case where it has been determined that a paper-ejection destination of the printing of the print request received when the instructions to start printing for the second copy in the electronic-sorting printing are waited for (after printing for the first copy has been performed as test printing), determined by the paper-ejection destination determining portion, is not the same as a paper-ejection destination of the electronic-sorting printing, the instructions to start the printing for the second copy in this electronic sorting printing having been waited for.

In this arrangement, in a case where a paper-ejection destination (paper-ejection tray) of a print request (second printing job) is not the same as a paper-ejection destination (paper-ejection tray) of electronic-sorting printing (first printing job), instructions to start printing of copies subsequent to a first copy in this electronic-sorting printing having been waited for, printing of the print request (second printing job) is performed. Thereby, it is not necessary for an operator who have made the print request (second printing job) to the printer apparatus to wait.

The printer apparatus may further comprises a test printing priority portion which gives priority to test printing so as to perform the test printing in a case where the subsequent print request is received when the instructions to start printing for the second copy in the electronic-sorting printing are waited for and the test printing has been set in the above-mentioned print request.

In this arrangement, priority is given to test printing so that the test printing is performed when the test printing is set in a print request (second printing job). Thereby, it is not necessary for an operator who have made the print request (second printing job) to the printer apparatus to wait.

The printer apparatus may further comprise a test printing priority selecting portion which is used for selecting whether the function of the test printing priority portion is to be effected.

In this arrangement, it is possible to select whether or not priority is given to test printing so that the test printing is performed when the test printing has been set in a print request (second printing job). As a result, it is possible to prevent test printing from being mixed between first and second copies of electronic-sorting printing (first printing job).

Other objects and further features of the present invention will become more apparent from the following detailed description when read in conjunction with the accompanying drawings.

DETAILED DESCRIPTION OF THE PREFERRED EMBODIMENTS

Figure 3:
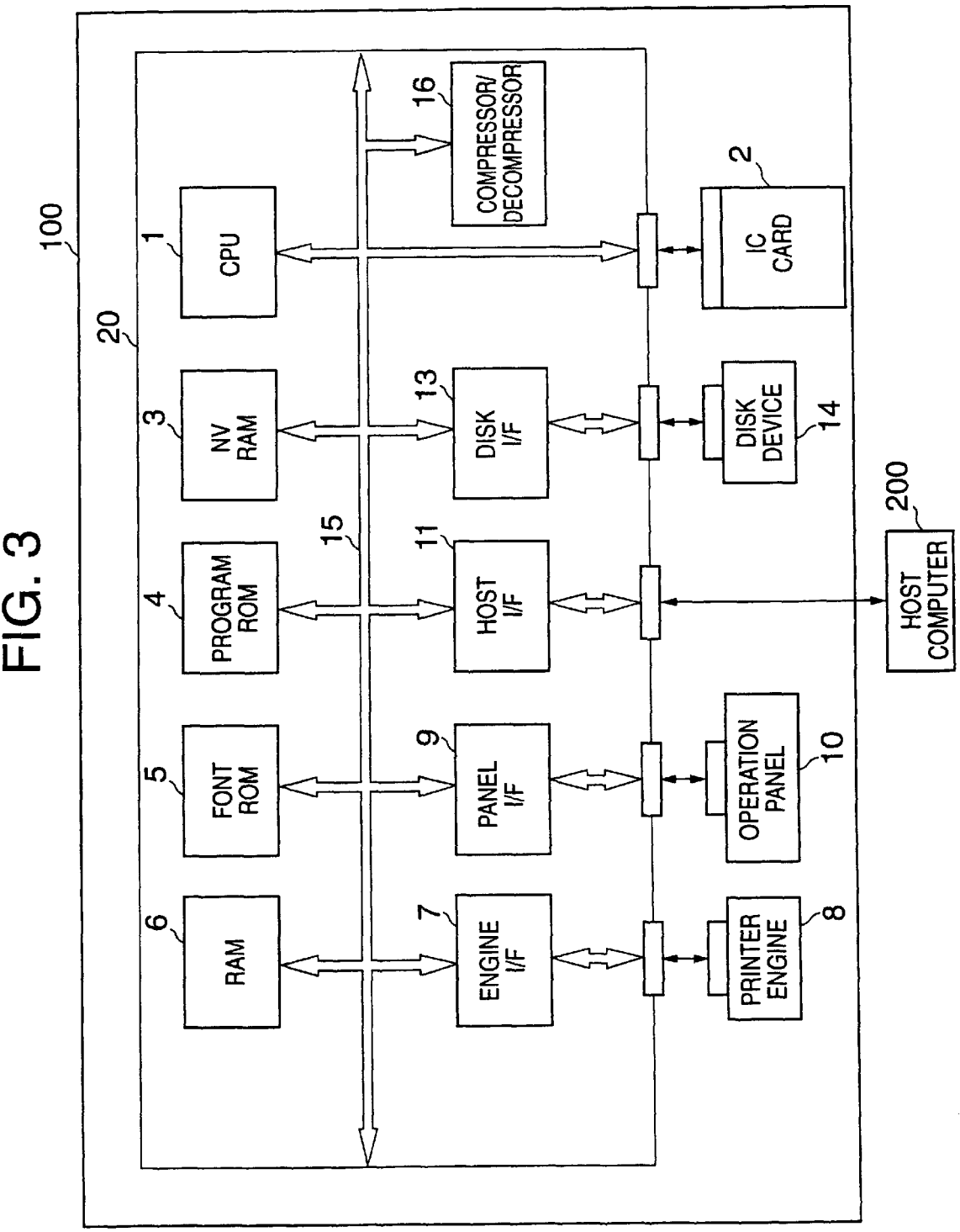
FIG. 3 is a hardware block diagram of a printer apparatus in a first embodiment of the present invention.

FIG. 3 shows a hardware block diagram of a printer apparatus in a first embodiment of the present invention.

The printer apparatus 100 includes a controller 20 which includes a CPU 1, an NVRAM 3, a program ROM 4, a font ROM 5, a RAM 6, four interfaces (I/F) 7 (engine), 9 (panel), 11 (host), 13 (disk), a compressor/decompressor 16 and a bus line 15 connecting these elements.

The CPU 1 controls the whole controller 20 by a program stored in the program ROM 4, a mode instruction produced from an operation panel 10, and a command produced from a host computer 200, etc. Further, from an IC card 2 mounted in the printer apparatus 100, font data and programs may also be provided.

The NVRAM 3 is a non-volatile storage device storing a content of the mode instruction produced from the operation panel 10.

The program ROM 4 is a read-only memory storing a control program of the controller 20.

The font ROM 5 stores pattern data, etc., of a character font. The RAM 6 is a random access memory which is used as a work memory of the CPU 1, an input buffer of input data, a page memory of the print data (frame buffer), a memory for a downloaded font, etc.

The engine I/F 7 is connected to a printer engine 8 for actually printing a paper, and is an interface for communicating a command, a status, and print data with the printer engine 8.

The panel I/F 9 is connected to the operation panel 10, and is an interface for communicating a command and a status with the operation panel 10. The operation panel 10 is a panel device for displaying a present printer-apparatus condition to the user, and for the user inputting the mode instruction.

The host I/F 11 is an interface for communicating with the host computer 200. For the host I/F 11, a Centronics I/F and an RS232C are commonly used.

The disk I/F 13 is an interface for communicating with a disk device 14. The disk device 14 is an external storage device for storing the font data, the program, and any data such as print data. For the disk device 14, a floppy disk device and a hard disk device are usable.

The compressor/decompressor 16 compresses and encodes bit-map-developed image data or decompresses and decodes the encoded data.

Figure 4:
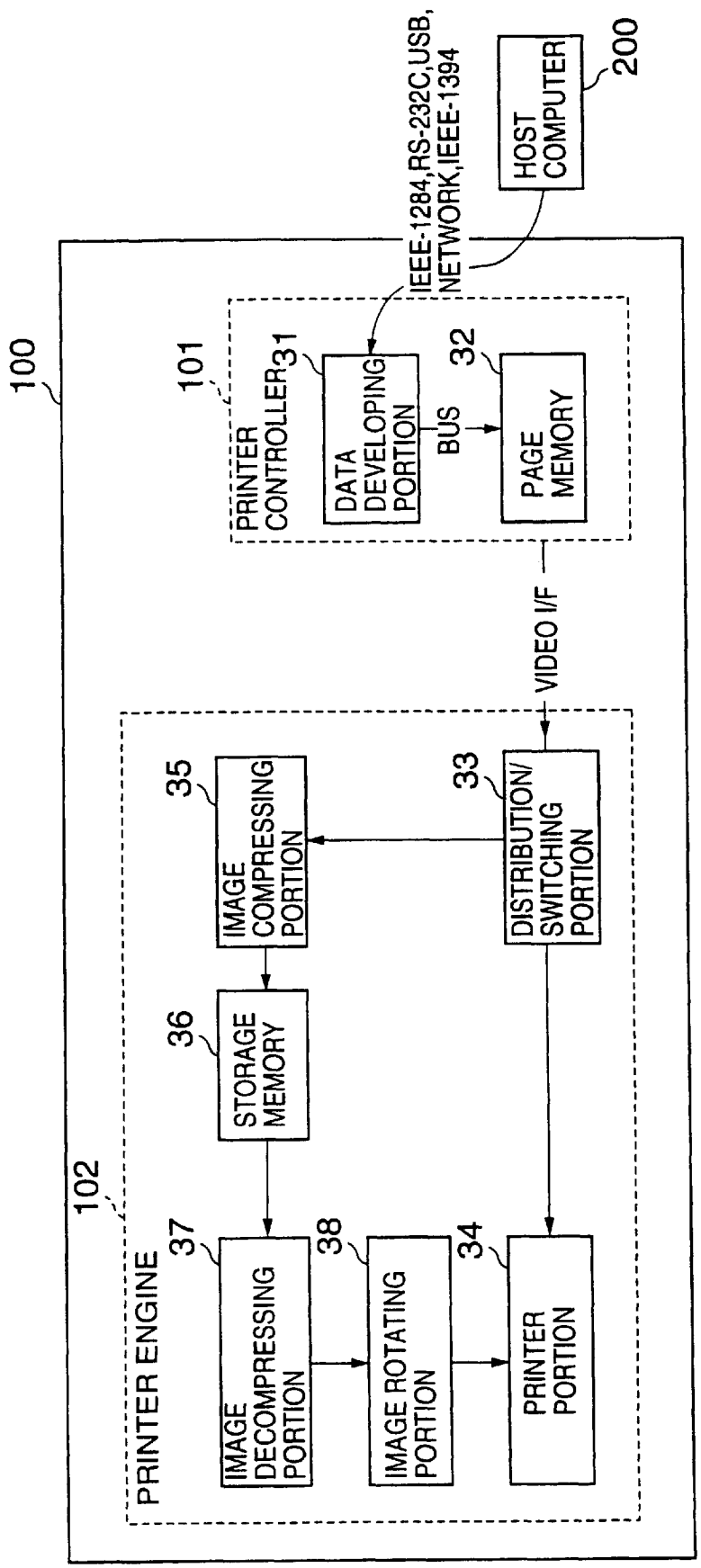
FIG. 4 is a functional block diagram of the printer apparatus in the first embodiment of the present invention.

FIG. 4 shows a functional block diagram of the above-described printer apparatus 100.

This printer apparatus 100 includes a printer controller 101 and a printer engine 102.

The printer controller 101 includes a data developing portion 31 and a page memory 32. The data developing portion 31 receives data from the host computer 200, which is a higher-order apparatus, via an appropriate interface. Based on the thus-received data, the printer controller 101 generates and develops image data (image data in a bit-map format or the like) in the page memory 32. The page memory 32 is connected to the printer engine 102 through an interface, such as a video interface, which can cope with transmission speed of an image signal. Further, not shown in FIG. 4, a control portion for controlling the printer engine 102 is provided in the printer controller 101, and the control portion of the printer controller 101 is connected with a control board, not shown in FIG. 4, in the printer engine 102, through control lines.

It is not necessary for the page memory 32 to store therein image data directly as an image, that is, in a form obtained as a result of being developed in a bit map format, as long as it is possible to perform transfer of image data to the printer engine 102. For example, a system in which image data, which has been written in a compressed form, is decompressed in sequence and transferred, or a system in which the data developing portion 31 transforms data to a format of intermediate code, and develops the intermediate code to produce image data in real time, may be provided.

The printer engine 102 includes a distribution/switching portion 33, a printer portion 34, an image compressing portion 35, a storage memory 36, an image decompressing portion 37 and an image rotating portion 38.

In the storage memory 36, image data read from the page memory of the printer engine 102 and transferred thereto is stored via the distribution/switching portion 33 and image compressing portion 35. The image compressing portion 35 compresses the image data when the image data is input to the storage memory 36. When the image data is output from the storage memory 36, the image decompressor 37 decompresses the compressed image data. The image rotating portion 38 rotates by 90° the image data from the image decompressing portion 37, and outputs it. The distribution/switching portion 33 is a functional block which selects a transfer destination of image data, so as to transfer image data read from the page memory 32 and transferred thereto only to the storage memory 36 via the image compressing portion 35, transfer the image data to the printer portion directly, or transfer the image data to both the storage memory 36 and the printer portion 34 at the same time. In a normal printing, image data transferred from the page memory 32 is input to the printer portion 34 directly via the distribution/switching portion 33. When, for example, printing is performed for copies subsequent to a first copy in a case where electronic sorting is performed, image data transferred from the page memory 32 is compressed by the image compressing portion 36, stored in the storage memory 36 once, then, is decompressed by the image decompressing portion 37 and is input to the printer portion 34.

Generally speaking, because it is difficult to predict the size of compressed image data, it is difficult to determine whether or not input image data can be stored in the storage memory 36 from a remaining capacity of the storage memory 36. Further, in order to effect a rotation-sorting function, it is necessary to place the image rotating portion 38 which performs rotation of image after the storage memory 36, that is, at the output side of the storage memory 36. If the image rotating portion is placed before the storage memory 36, that is, at the input side thereof, it is necessary to store two kinds of image data, one before rotation and the other after rotation, for the same page. Therefore, it is necessary to double the capacity of the storage memory 36, resulting in a big raise in the costs.

Figure 1:
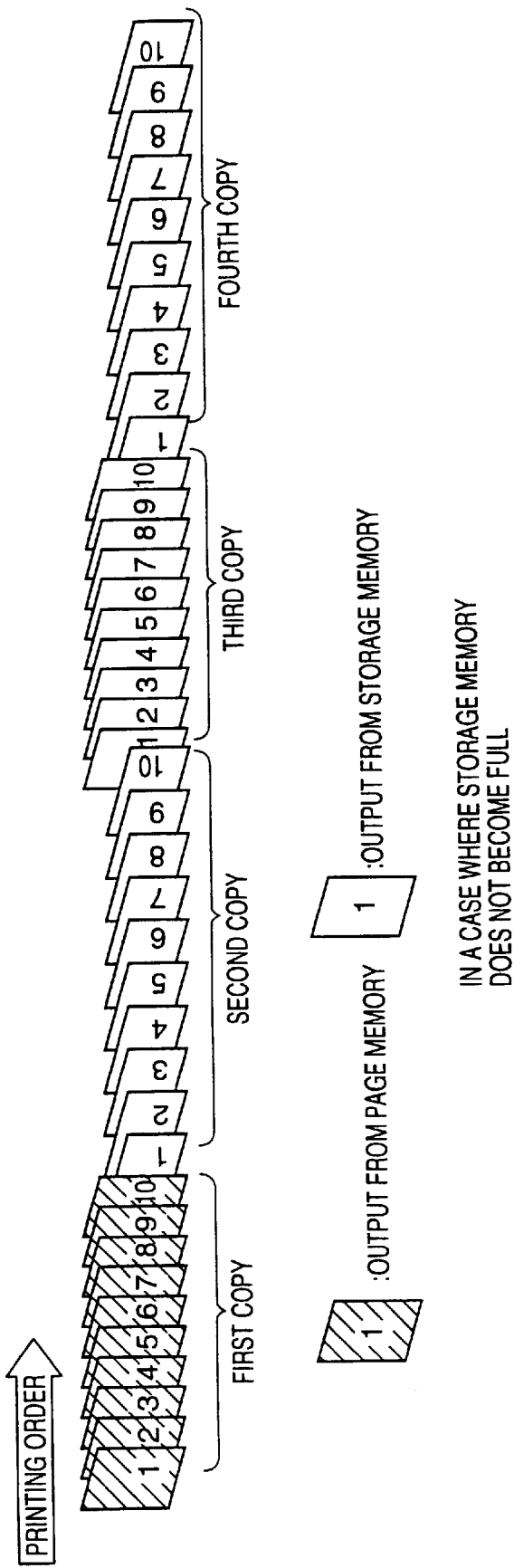
FIG. 1 illustrates an output example in a case where a document consisting of a plurality of pages has been printed continuously so as to obtain a plurality of copies of the document using a combination of electric sorting and rotation sorting.

When printing out is performed using a function of a combination of electronic sorting and rotation sorting in the printer apparatus 100, in a case where, for example, document data consisting of 10 pages is printed out so as to obtain four copies of the document data, an output result such as that shown in FIG. 1 can be obtained. In this case, for a first copy, image data is input to the storage memory 36 and to the printer portion 34 at the same time. For copies subsequent to the first copy, the image data is sent to the printer portion 34 from the storage memory 36, and, at this time, only for even-numbered (second, fourth, . . . ) copies, rotation of the image data is performed by the image rotating portion 38.

A case where the storage memory 36 becomes full during storage of input image data therein will now be considered.

In this case, when the contents of the storage memory 36 are printed out for the specified number of copies (forcible printing for the copies subsequent to the first copy) in order to empty the storage memory 36, and, then, after the storage memory 36 is emptied, the subsequent image data is input to the storage memory 36 and sorting printing is performed using the thus-stored image data, the last page which has been printed out for the first copy is not printed thereafter. In order to solve this problem, it is assumed that, the pages of image data which are stored in the storage memory 36 are sent from the storage memory 36 to the printer portion 34 and are printed out for the specified number of copies, and, the page of image data processed at the time the storage memory 36 became full is sent to the printer portion 34 directly from the page memory 32 via the distribution/switching portion 33 and is printed out.

Figure 2:
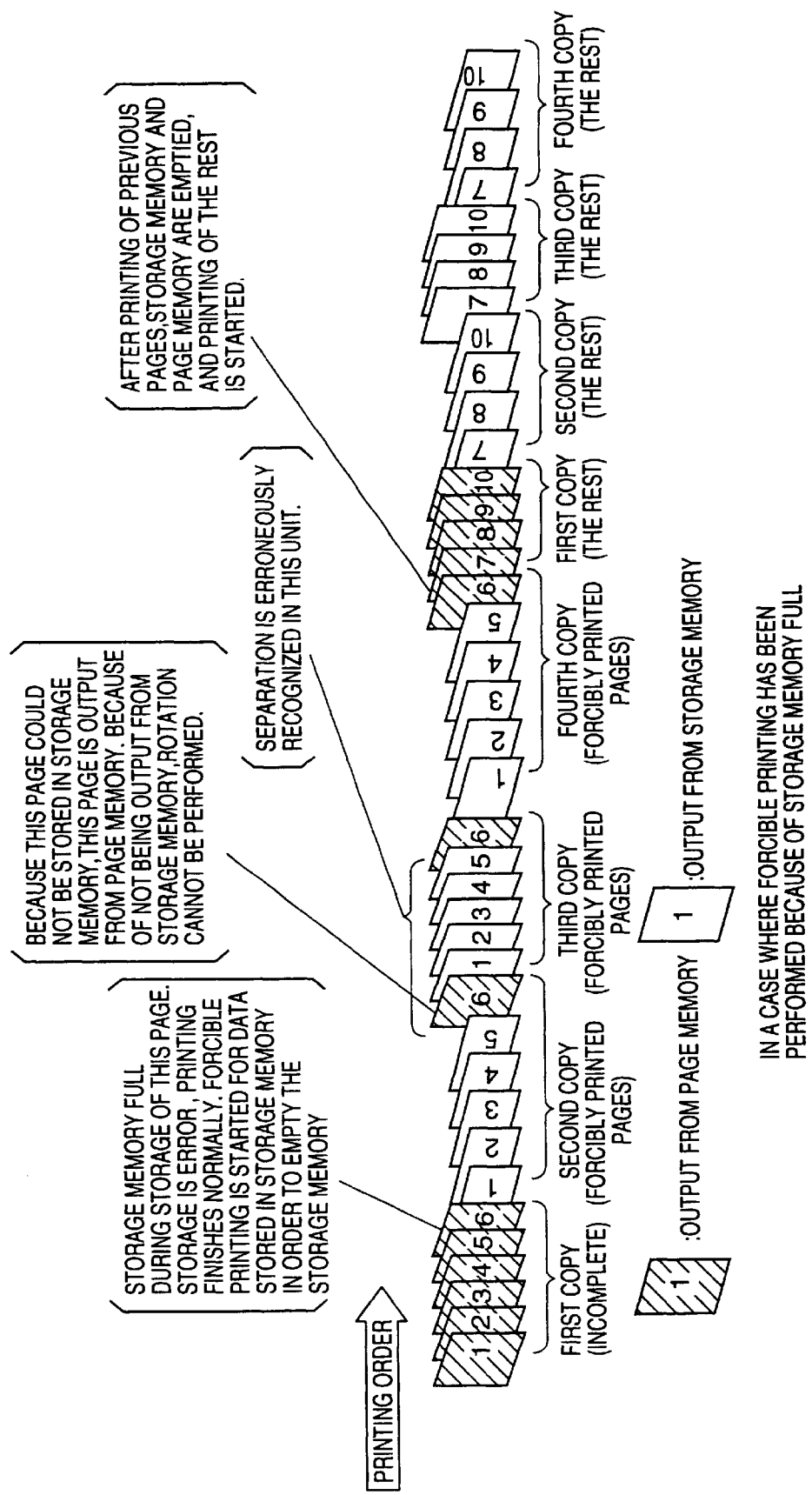
FIG. 2 illustrates an example of a result of coping with a case where a storage memory becomes full during storage of image data for a first copy when the printing shown in FIG. 1 has been attempted to be performed.

However, as can be seen from the arrangement shown in FIG. 4, because the image data sent to the printer portion 34 directly from the page memory 32 via the distribution/switching portion 33 does not pass through the image rotating portion 38, it is not possible to perform the image rotation processing on this image data. As a result, when the image rotation processing is performed on the image data from the storage memory 36, sorting is performed in erroneous units, as shown in FIG. 2. In this case, it is necessary for an operator to again perform sorting manually. Therefore, in comparison to a case where only electronic sorting is performed but rotation sorting is not performed, the operator must perform a troublesome work.

In order to solve this problem, the printer apparatus 100 in the first embodiment operates as follows. Operation of the first embodiment will now be described in accordance with flows shown in FIGS. 5, 7, 9, 11, 13, 15 and 17. The same reference numerals are given to common steps, and duplicated description will be omitted appropriately. Operation flows which will now be described show processing procedures of the control portion (CPU 1, shown in FIG. 3) provided in the printer controller 101.

Figure 5:
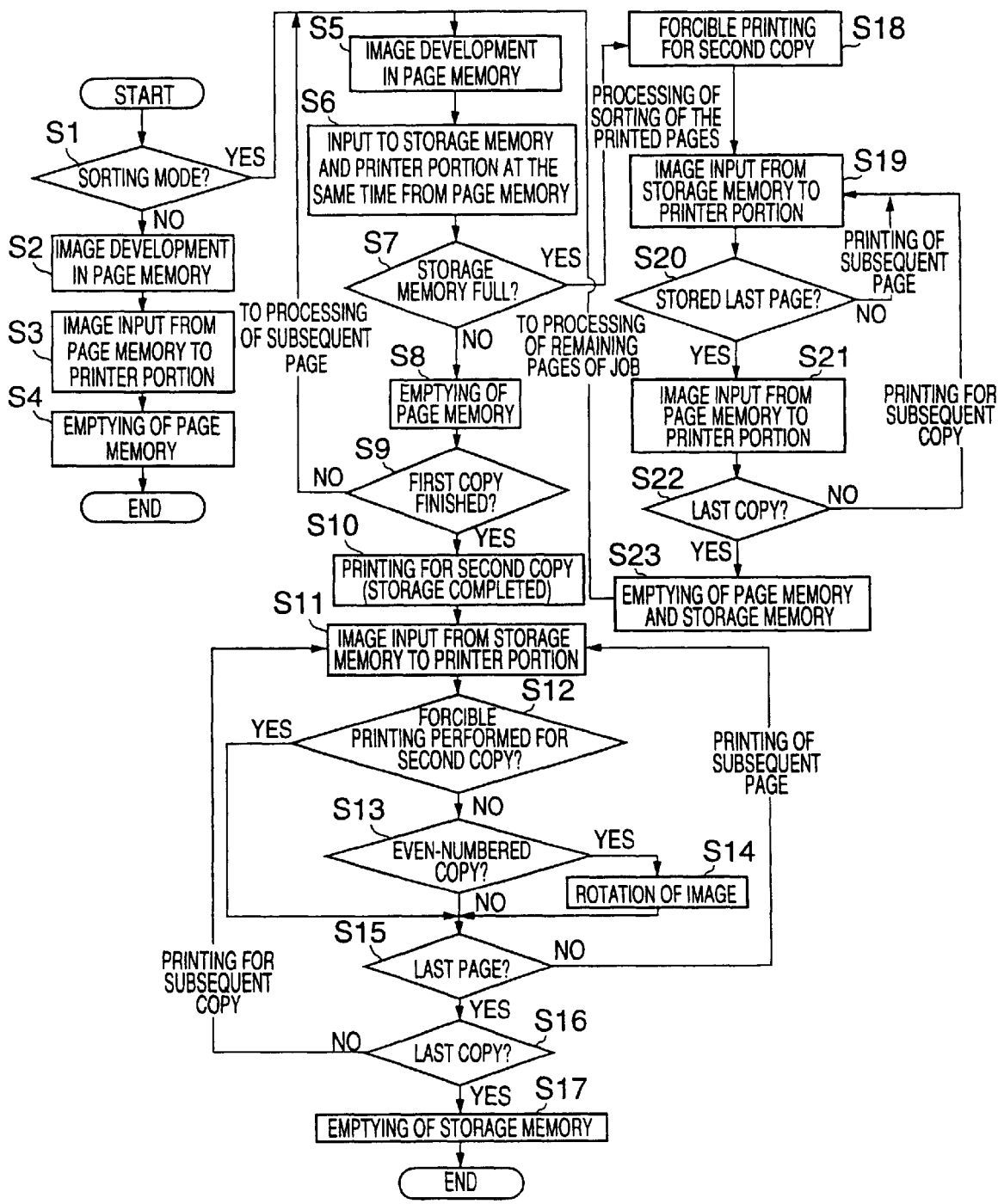
FIG. 5 is a flow chart illustrating a flow of operation in a first example performed in the printer apparatus in the first embodiment of the present invention.

FIG. 5 is a flow chart illustrating a flow of operation in a first example performed in the printer apparatus 100 in the first embodiment of the present invention. In an operation flow shown in FIG. 5, a set mode, a number of copies and so forth are obtained, and it is determined whether or not a mode is set to a sorting mode (in a step S1). When the sorting mode has not been set (No in the step S1), data received from the host computer 200 is developed in the page memory 32 (in a step S3), is transferred to the printer portion 34 directly via the distribution/switching portion 33 of the printer engine 102 and is printed out, and, then, the page memory 32 is emptied for subsequent data (in a step S4).

On the other hand, when the sorting mode has been set (Yes in the step S1), data received from the host computer 200 is developed in the page memory 32 (in a step S5), and is transferred to the printer portion 34 and storage memory 36 at the same time via the distribution/switching portion 33 of the printer engine 102 (in a step S6). Then, it is monitored whether or not the storage memory 36 has become full (the storage memory 36 has been filled with data to capacity) (in a step S7). When the storage memory 36 has not become full (No in the step S7), the page memory 32 is emptied (in a step S8), subsequent image data is developed in the step S5, and is transferred to the printer portion 34 and storage memory 36 at the same time via the distribution/switching portion 33 of the printer engine 102 (in the step S6). This is repeated, and, then, when the storage processing and printing-out processing for the first copy have been finished without the storage memory 36 becoming full (Yes in a step S9), the storage processing to the storage memory 36 has been finished at the same time, and printing-out processing for copies subsequent to the first copy is started (in a step S10).

In the printing-out processing for the copies subsequent to the first copy, the image data stored in the storage memory 36 is decompressed by the image decompressing portion 37 in sequence from the first page and is input to the printer portion 34 (in a step S11). Then, it is determined (in a step S12) whether or not forcible printing for the copies subsequent to the first copy has been performed. When the forcible printing for the copies subsequent to the first copy has not been performed (No in the step S12), it is determined (in a step S13) whether or not the current printing processing is for an even-numbered copy (second copy, fourth copy, sixth copy, . . . ). When the current printing processing is for an even-numbered copy (Yes in the step S13), the image data from the image decompressing portion 37 is rotated (in a step S14), and, then, is input to the printer portion 34 (in the step S11). When the current printing processing is not for an even-numbered copy (Yes in the step S13), the image data from the image decompressing portion 37 is not rotated, and, then, is input to the printer portion 34 (in the step S11). When printing-out processing of the last page has been finished (Yes in a step S15), printing-out processing for the subsequent copy is started, and the above-mentioned series of processing (S11–S15) is repeated. Then, when printing-out processing for the specified number of copies has been completed (Yes in a step S16), the storage memory 36 is emptied (in a step S17), and the printing-out processing is finished.

On the other hand, when it has been determined in the step S7 that the storage memory 36 has become full (Yes in the step S7), that is, when the storage memory 36 has become full during storage of the image data for the first copy in the storage memory 36, the function of the image rotating portion 38 is caused to be not effected and forcible printing for the copies subsequent to the first copy is started (in a step S18). At this time, the pages of image data which are stored in the storage memory 36 are decompressed by the image decompressing portion 37 in sequence, are input to the printer portion 34, and are printed out (in a step S19). Then, each time when the last page stored in the storage memory 36 has been printed out (Yes in a step S20), the image data, stored in the page memory 32, of the page processed at the time the storage memory 36 became full is transferred to the printer portion 34 directly via the distribution/switching portion 33, and is printed out. The above-mentioned series of processing (S19–S21) is repeated. Then, when printing-out processing for the specified number of copies has been completed (Yes in a step S22), the storage memory 36 and page memory 32 are emptied (all the data stored in the storage memory 36 and page memory 32 is erased) for printing-out processing of the remaining pages (in a step S23), and, the processing starting from the step S5 is started.

When the forcible printing for the copies subsequent to the first copy is performed as mentioned above, after printing-out processing of the remaining pages (newly transferred from the page memory 32 to the storage memory 36 and to the printer portion 34) for the first copy, the step 15 is performed after the step 12 is performed, and the processing (S11–S15) is repeated until printing-out processing of the last page of the remaining pages stored in the storage memory 36 is finished. Then, when printing-out processing for the specified number of copies has been completed (Yes in the step S16), the storage memory 36 is emptied (in the step S17) and the printing-out processing is finished.

Figure 6:
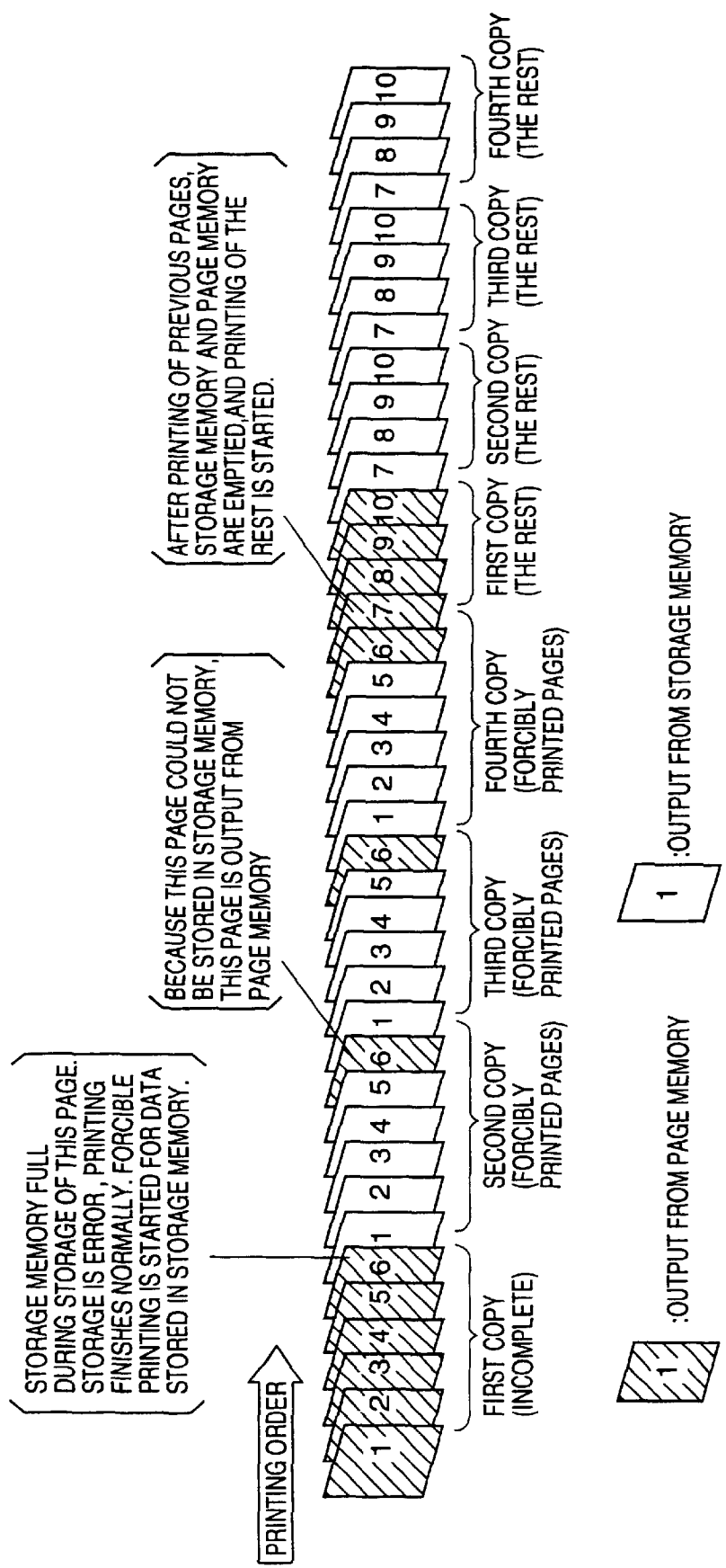
FIG. 6 shows an example of an output result of the operation in accordance with the flow shown in FIG. 5.

As mentioned above, the rotation sorting is performed using the image rotating portion 38 only when the storage of the image data in the storage memory 36 has been normally completed. When the forcible printing is performed, the function of the image rotating portion 38 is caused to be not effected, and, also, the pages of image data which are stored in the storage memory 36 are used and are printed out, and, the page of image data processed at the time the storage memory 36 became full is transferred to the printer portion 34 from the page memory 32 without passing through the storage memory 36, and is printed out. Thereby, when document data consisting of 10 pages is attempted to be printed out so as to obtain four copies of the document data using the rotation sorting, in a case where the storage memory 36 becomes full before storage of the image data of the sixth page in the storage memory 36 is finished, an output result shown in FIG. 6 is obtained. In this case, although the boundary between adjacent copies cannot be recognized, the printing-out processing for the specified number of copies can be performed to the end, and, also, it is possible to prevent sorting in erroneous units.

Figure 7:
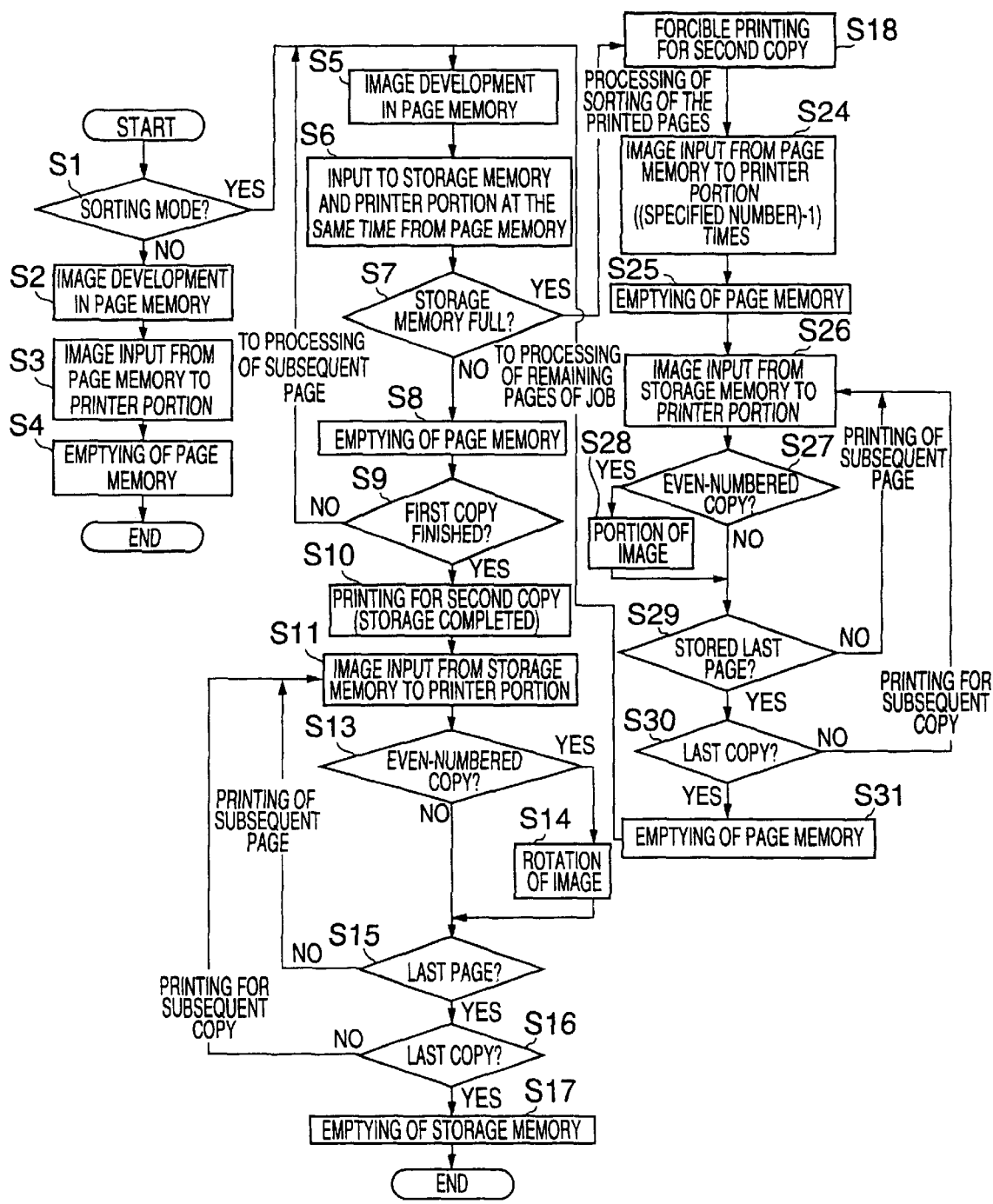
FIG. 7 is a flow chart illustrating a flow of operation in a second example performed in the printer apparatus in the first embodiment of the present invention.

FIG. 7 is a flow chart illustrating a flow of operation in a second example performed in the printer apparatus 100 in the first embodiment of the present invention. An operation flow in a case where the sorting mode has not been set and an operation flow in a case where the storage memory 36 does not become full during storage of image data for a first copy are the same as those shown in FIG. 5. In the flow shown in FIG. 7, when it has been determined in a step S7 that the storage memory 36 has become full (Yes in the step S7), that is, when the storage memory 36 has become full during storage of the image data for the first copy, the function of the image rotating portion 38 is not caused to be not effected, and forcible printing for copies subsequent to the first copy is started (in a step S18). At this time, after printing out for the first copy, the image data, stored in the page memory 32, of the page processed at the time the storage memory 36 became full is transferred to the printer portion 34 directly via the distribution/switching portion 33, and is printed out so as to make a number of copies (in this example, 3 copies) of the page (in a step S24), which number is obtained from subtracting 1 from a specified number of copies (in this example, 4 copies). Then, the page memory 32 is emptied (in a step S25). Then, the image data stored in the storage memory 36 is decompressed by the image decompressing portion 37 in sequence from the first page, and is input to the printer portion 34 (in a step S26). Then, it is determined (in a step S27) whether the current printing processing is for an even-numbered copy (second copy, fourth copy, sixth copy, . . . ). When the current printing processing is for an even-numbered copy, the image data from the image decompressing portion 37 is rotated (in a step S28), and is input to the printer portion 34. When the current printing processing is not for an even-numbered copy, the image data from the image decompressing portion 37 is not rotated, and is input to the printer portion 34. When printing-out processing of the stored last page has been finished (Yes in a step S29), printing-out processing for the subsequent copy is started, and the above-mentioned series of processing (S26–S29) is repeated. Then, when printing-out processing for the specified number of copies has been completed (Yes in a step S30), the storage memory 36 is emptied (in a step S31), and processing starting from a step S5 is started. A flow of following operation is the same as that shown in FIG. 5.

Figure 8:
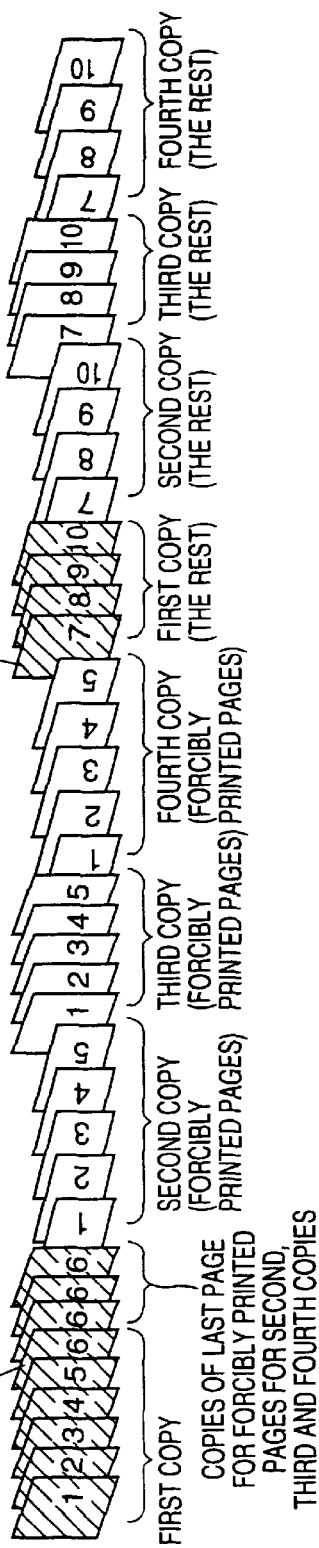
FIG. 8 shows an example of an output result of the operation in accordance with the flow shown in FIG. 7.

Thus, when the storage memory 36 has become full, before forcible printing for the copies subsequent to the first copy is performed, the image data stored in the page memory 32, on which data the rotation processing cannot be performed, is input to the printing portion 34 the times of the necessary number of copies ((the specified number)—1) and is printed out. Thereby, when document data consisting of 10 pages is attempted to be printed out so as to obtain four copies of the document data using the rotation sorting, in a case where the storage memory 36 becomes full before storage of the image data of the sixth page in the storage memory 36 is finished, an output result shown in FIG. 8 is obtained. In this case, the sheets on each of which the image data read from the page memory 32 has been printed out should be interleaved at predetermined positions later manually. However, the boundary between adjacent copies can be clearly recognized, and, also, the printing processing for the specified number of copies can be performed to the end. Therefore, it is possible to reduce a sorting work by human hands.

Figure 9:
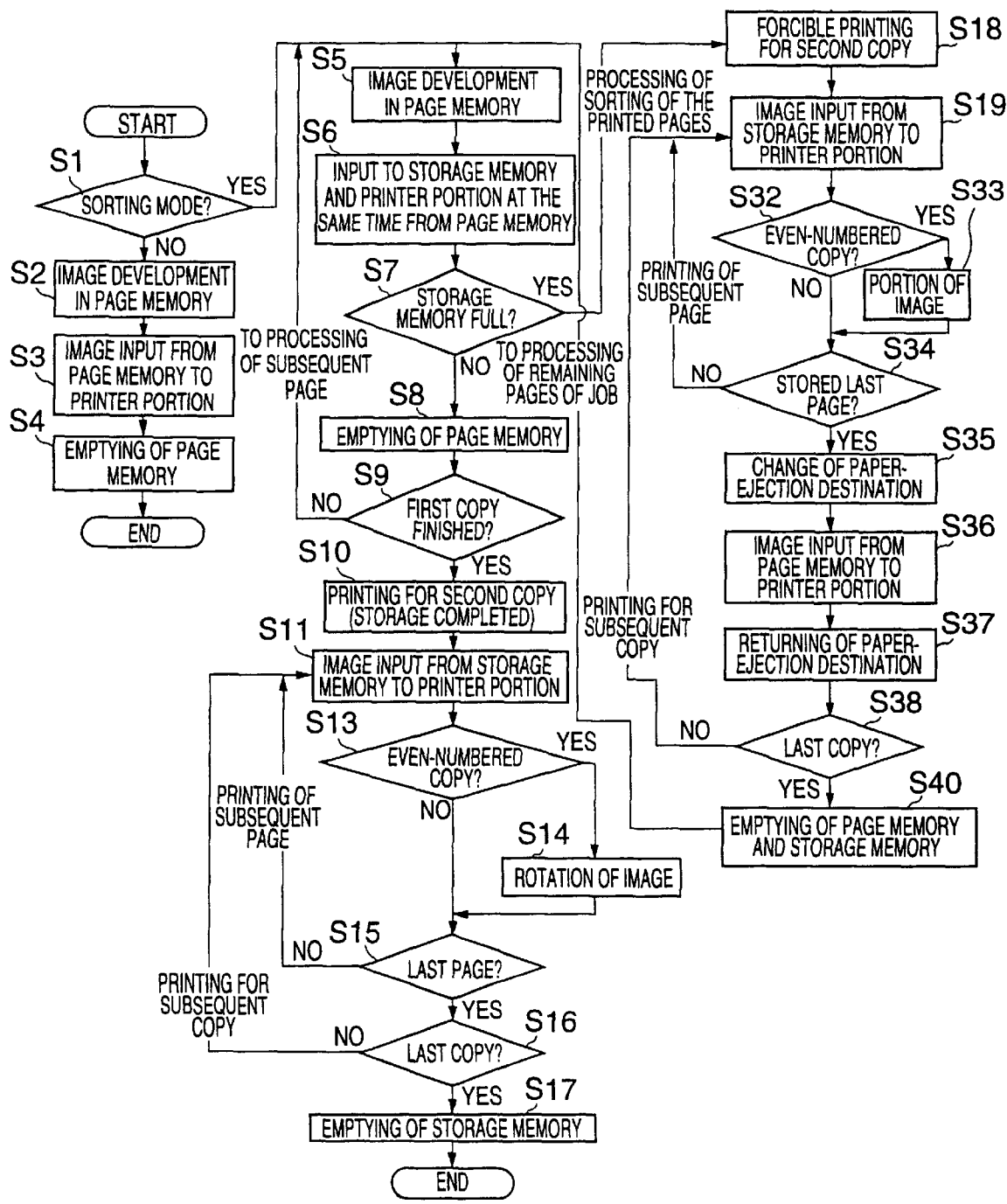
FIG. 9 is a flow chart illustrating a flow of operation in a third example performed in the printer apparatus in the first embodiment of the present invention.

FIG. 9 is a flow chart illustrating a flow of operation in a third example performed in the printer apparatus 100 in the first embodiment of the present invention. An operation flow in a case where the sorting mode has not been set and an operation flow in a case where the storage memory 36 does not become full during storage of image data for a first copy are the same as those shown in FIG. 5. In the flow shown in FIG. 9, when it has been determined in a step S7 that the storage memory 36 has become full (Yes in the step S7), that is, when the storage memory 36 has become full during storage of the image data for the first copy, the image data stored in the storage memory 36 is decompressed by the image decompressing portion 37 in sequence from the first page, and is input to the printer portion 34 (in a step S19). Then, it is determined (in a step S32) whether the current printing processing is for an even-numbered copy (second copy, fourth copy, sixth copy . . . ). When the current printing processing is for an even-numbered copy, the image data from the image decompressing portion 37 is rotated (in a step S33), and is input to the printer portion 34. When the current printing processing is not for an even-numbered copy, the image data from the image decompressing portion 37 is not rotated, and is input to the printer portion 34. When printing-out processing of the stored last page has been finished (Yes in a step S34), a destination to which sheets on which images have been printed, that is, a paper ejection tray is changed from an original one to another one (in a step S35), the image data, stored in the page memory 32, of the page processed at the time the storage memory 36 became full is transferred to the printer portion 34 directly via the distribution/switching portion 33, and is printed out (in a step S36). Then, the destination to which sheets on which images have been printed, that is, the paper ejection tray is returned to the original one (in a step S37), and the processing starting from the step S19 is repeated. Then, when printing-out processing for a specified number of copies has been completed (Yes in a step S38), the storage memory 36 and page memory 32 are emptied (in a step S40), and processing starting from a step S5 is started. A flow of following operation is the same as that shown in FIG. 5. Processing starting from a step S19 is repeated.

Figure 10:
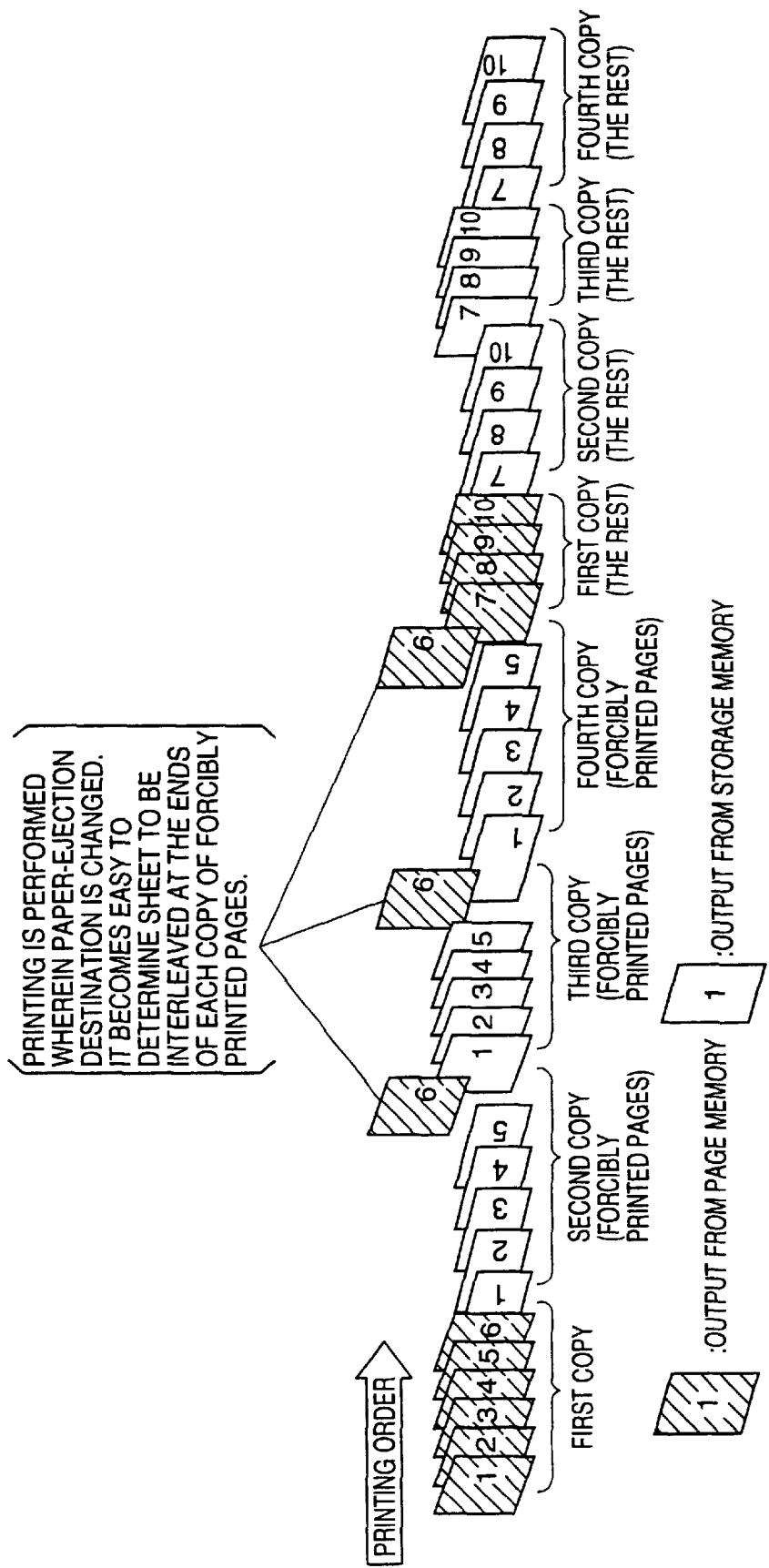
FIG. 10 shows an example of an output result of the operation in accordance with the flow shown in FIG. 9.

Thus, when the storage memory 36 has become full, the sheet on which the image data has been printed out, which data has been stored in the page memory 32, and on which data the rotation processing cannot be performed at the time of forcible printing for the copies subsequent to the first copy, is ejected to the paper ejection tray different from the paper ejection tray to which the other sheets are ejected. Thereby, when document data consisting of 10 pages is attempted to be printed out so as to obtain four copies of the document data using the rotation sorting, in a case where the storage memory 36 becomes full before storage of the image data of the sixth page in the storage memory 36 is finished, an output result shown in FIG. 10 is obtained. In this case, the sheets on each of which the image data read from the page memory 32 has been printed out should be interleaved at predetermined positions later manually. However, the boundary between adjacent copies can be clearly recognized, and, also, the printing processing for the specified number of copies can be performed to the end. Therefore, it is possible to reduce a sorting work by human hands.

Figure 11:
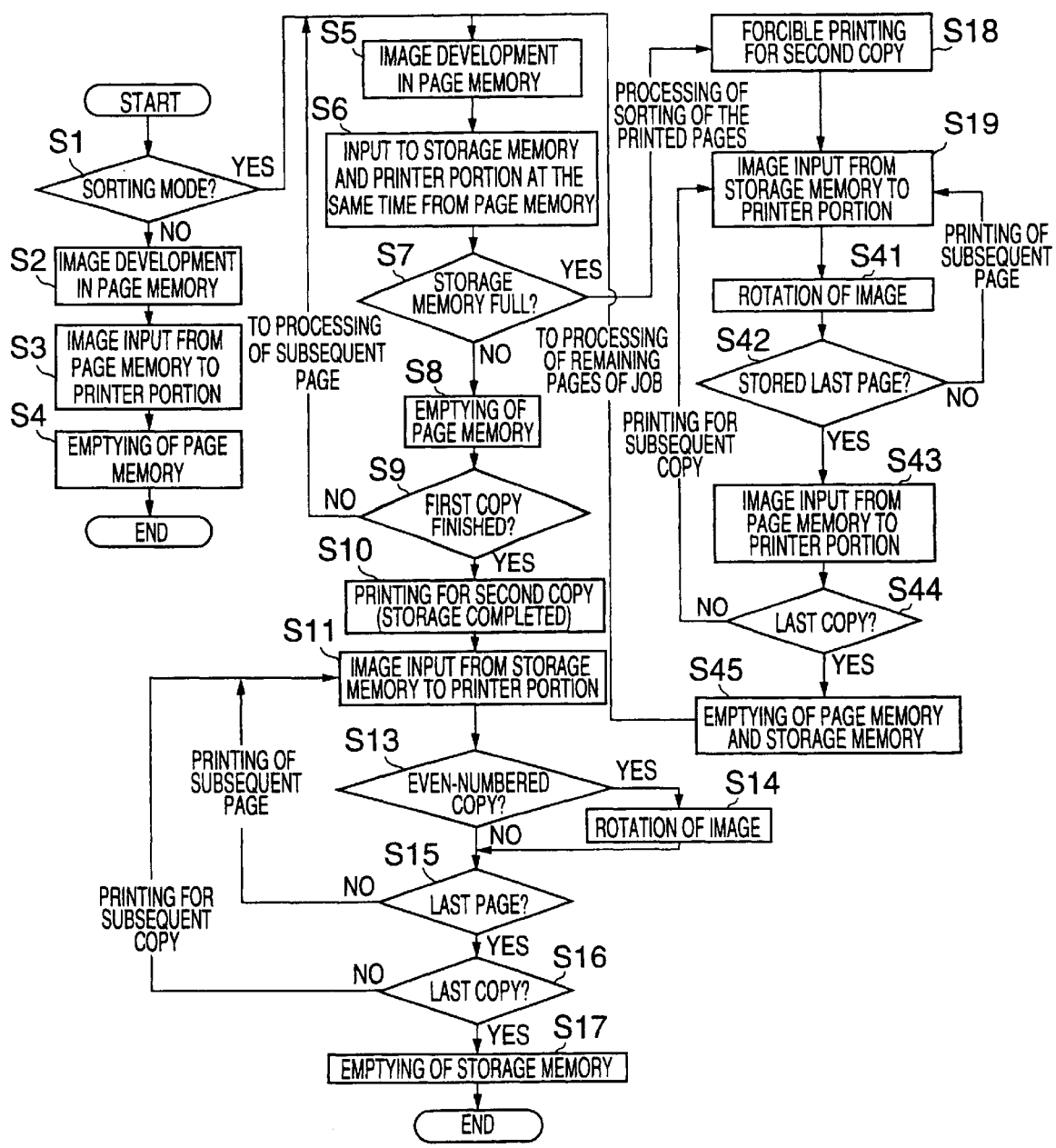
FIG. 11 is a flow chart illustrating a flow of operation in a fourth example performed in the printer apparatus in the first embodiment of the present invention.

FIG. 11 is a flow chart illustrating a flow of operation in a fourth example performed in the printer apparatus 100 in the first embodiment of the present invention. An operation flow in a case where the sorting mode has not been set and an operation flow in a case where the storage memory 36 does not become full during storage of image data for a first copy are the same as those shown in FIG. 5. In the flow shown in FIG. 11, when it has been determined in a step S7 that the storage memory 36 has become full (Yes in the step S7), that is, when the storage memory 36 has become full during storage of the image data for the first copy, the image data stored in the storage memory 36 is decompressed by the image decompressing portion 37 in sequence from the first page, and is input to the printer portion 34 (in a step S19). At this time, regardless of whether or not the current printing processing is for an even-numbered copy, the image data from the image decompressing portion 37 is rotated (in a step S41), and is input to the printer portion 34. Then, when printing-out processing of all the pages of the image data stored in the storage memory 36 has been finished (Yes in a step S42), the image data, stored in the page memory 32, of the page processed at the time the storage memory 36 became full is transferred to the printer portion 34 directly via the distribution/switching portion 33, and is printed out (in a step S43). Then, processing starting from a step S19 is repeated. Then, when printing-out processing for a specified number of copies has been completed (Yes in a step S44), the storage memory 36 and page memory 32 are emptied (in a step S45), and processing starting from a step S5 is started. A flow of following operation is the same as that of FIG. 5.

Figure 12:
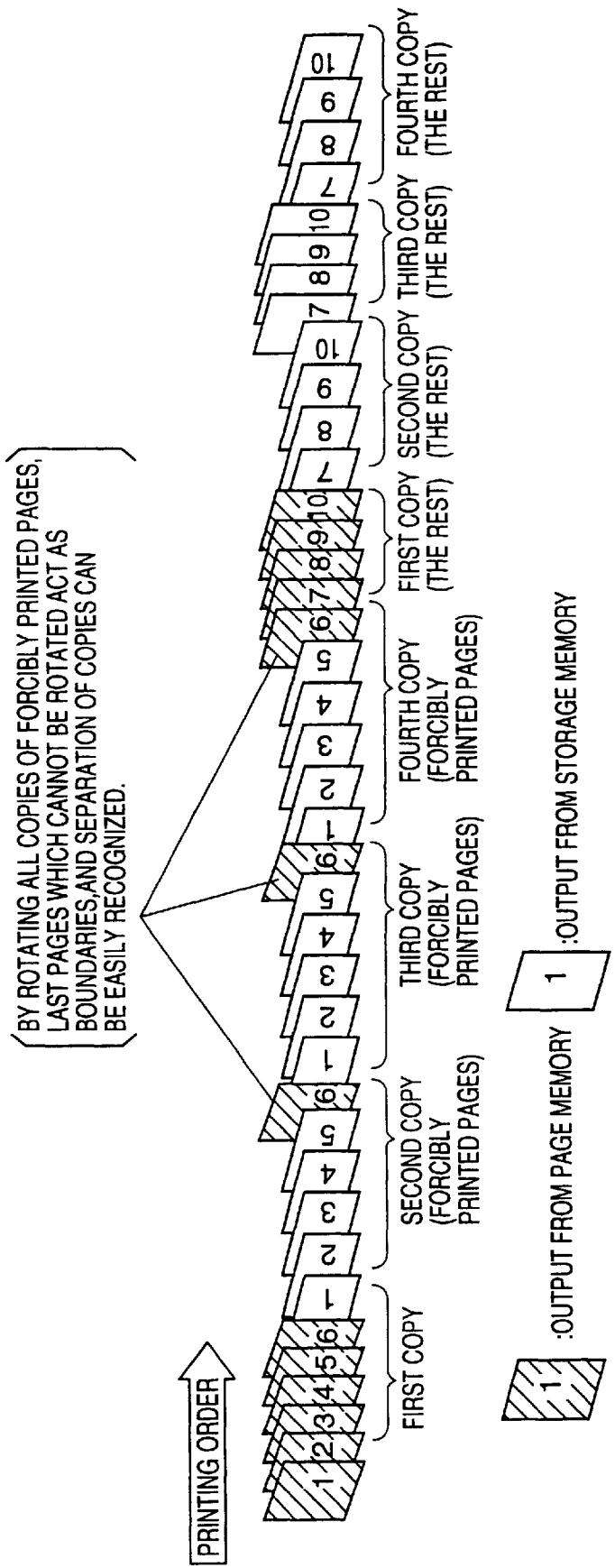
FIG. 12 shows an example of an output result of the operation in accordance with the flow shown in FIG. 11.

Thus, when the storage memory 36 has become full, all the image data stored in the storage memory 36 is rotated and is printed out in the forcible printing for the copies subsequent to the first copy. Thereby, when document data consisting of 10 pages is attempted to be printed out so as to obtain four copies of the document data using the rotation sorting, in a case where the storage memory 36 becomes full before storage of the image data of the sixth page in the storage memory 36 is finished, an output result shown in FIG. 12 is obtained. In this case, the page of image data, read from the page memory 32, on which data the rotation processing cannot be performed, is printed out, and the-thus-obtained copies of the page act as boundaries. As a result, it is possible to more clearly recognize the boundary between adjacent copies. Thereby, it is possible to reduce a sorting work by human hands.

Figure 13:
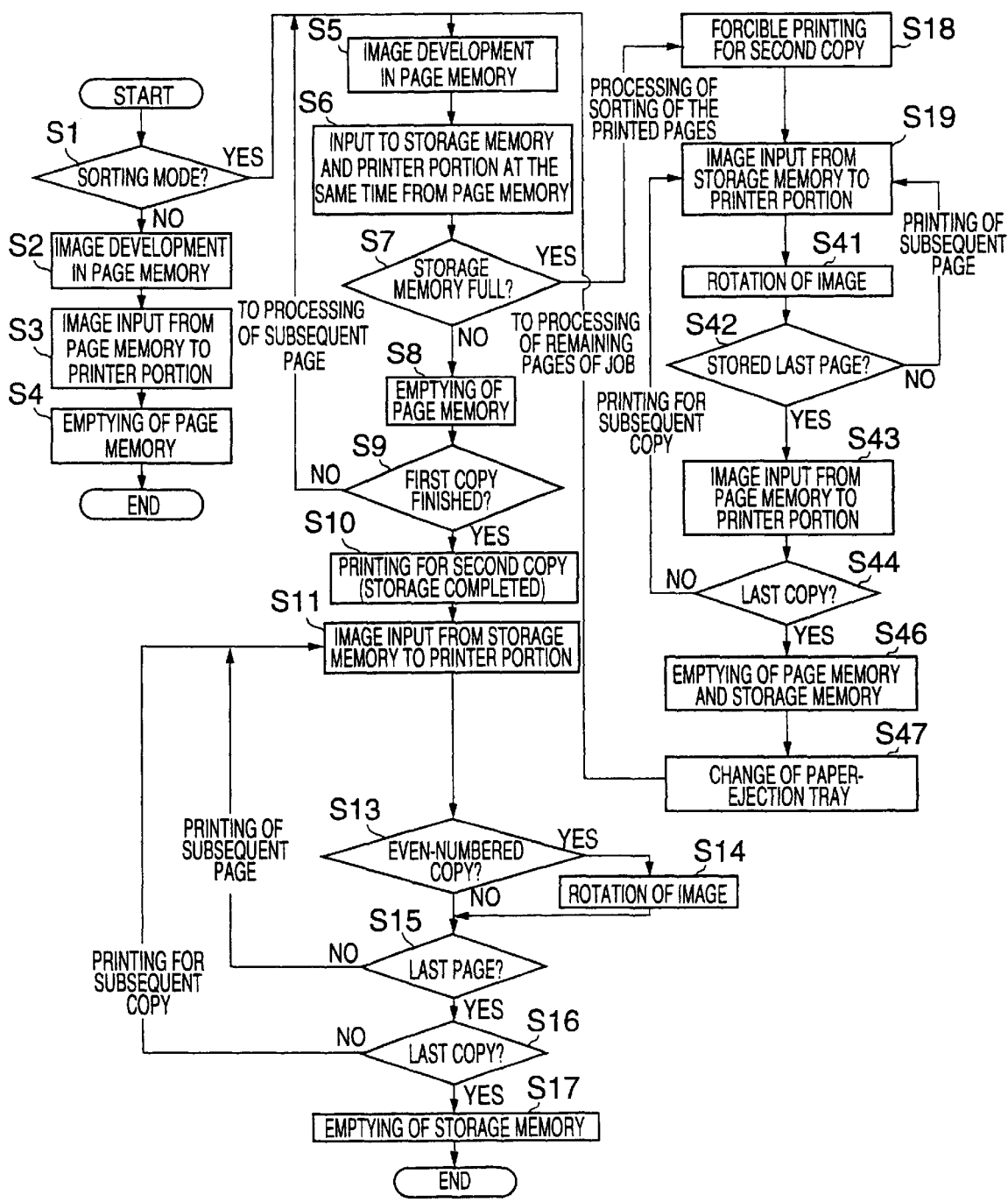
FIG. 13 is a flow chart illustrating a flow of operation in a fifth example performed in the printer apparatus in the first embodiment of the present invention.

FIG. 13 is a flow chart illustrating a flow of operation in a fifth example performed in the printer apparatus 100 in the first embodiment of the present invention. An operation flow in a case where the sorting mode has not been set and an operation flow in a case where the storage memory 36 does not become full during storage of image data for a first copy are the same as those shown in FIG. 5. In the flow shown in FIG. 13, when it has been determined in a step S7 that the storage memory 36 has become full (Yes in the step S7), that is, when the storage memory 36 has become full during storage of the image data for the first copy, the image data stored in the storage memory 36 is decompressed by the image decompressing portion 37 in sequence from the first page, and is input to the printer portion 34 (in a step S19). At this time, regardless of whether or not the current printing processing is for an even-numbered copy, the image data from the image decompressing portion 37 is rotated (in a step S41), and is input to the printer portion 34. Then, when printing-out processing of all the pages of the image data stored in the storage memory 36 has been finished (Yes in a step S42), the image data, stored in the page memory 32, of the page processed at the time the storage memory 36 became full is transferred to the printer portion 34 directly via the distribution/switching portion 33, and is printed out (in a step S43). Then, processing starting from a step S19 is repeated. Then, when printing-out processing for a specified number of copies has been completed (Yes in a step S44), the storage memory 36 and page memory 32 are emptied (in a step S46), a destination to which sheets on which images have been printed, that is, a paper ejection tray is changed from an original one to another one (in a step S47), and processing starting from a step S5 is started, and printing processing of the remaining pages is performed. A flow of following operation is the same as that of FIG. 5.

Figure 14:
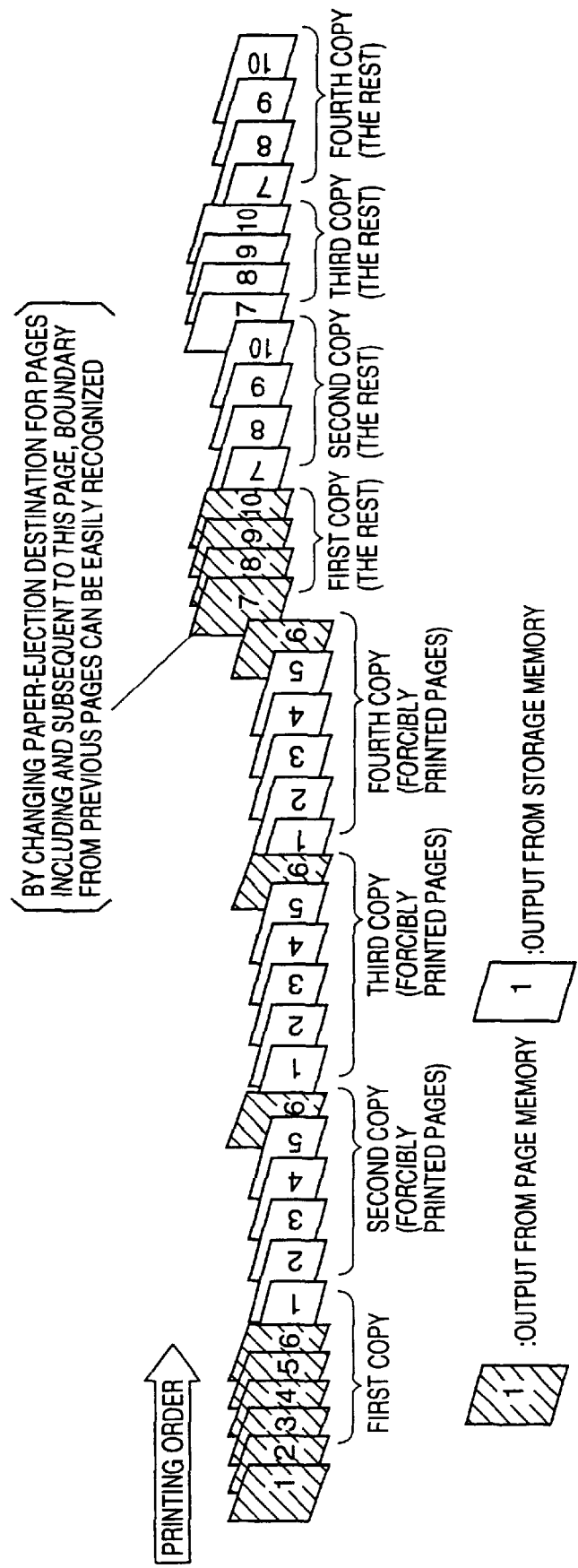
FIG. 14 shows an example of an output result of the operation in accordance with the flow shown in FIG. 13.

Thus, when the storage memory 36 has become full, all the image data stored in the storage memory 36 is rotated and is printed out in forcible printing for the copies subsequent to the first copy, and, also, the sheets on which the incomplete sets of pages of the image data printed out in the forcible printing for the copies subsequent to the first copy has been printed out are ejected to an output destination (paper ejection tray) and the sheets on which the remaining pages of the image data has been printed out are ejected to a different output destination (paper ejection tray). Thereby, when document data consisting of 10 pages is attempted to be printed out so as to obtain four copies of the document data using the rotation sorting, in a case where the storage memory 36 becomes full before storage of the image data of the sixth page in the storage memory 36 is finished, an output result shown in FIG. 14 is obtained. In this case, the page of image data, read from the page memory 32, on which data the rotation processing cannot be performed, is printed out, and the-thus-obtained copies of the page act as boundaries. Also, it is possible to more clearly recognize the boundary between the incomplete sets of pages printed out through the forcible printing for the copies subsequent to the first copy and the following pages (the rest). Thereby, it is possible to reduce a sorting work by human hands.

Figure 15:
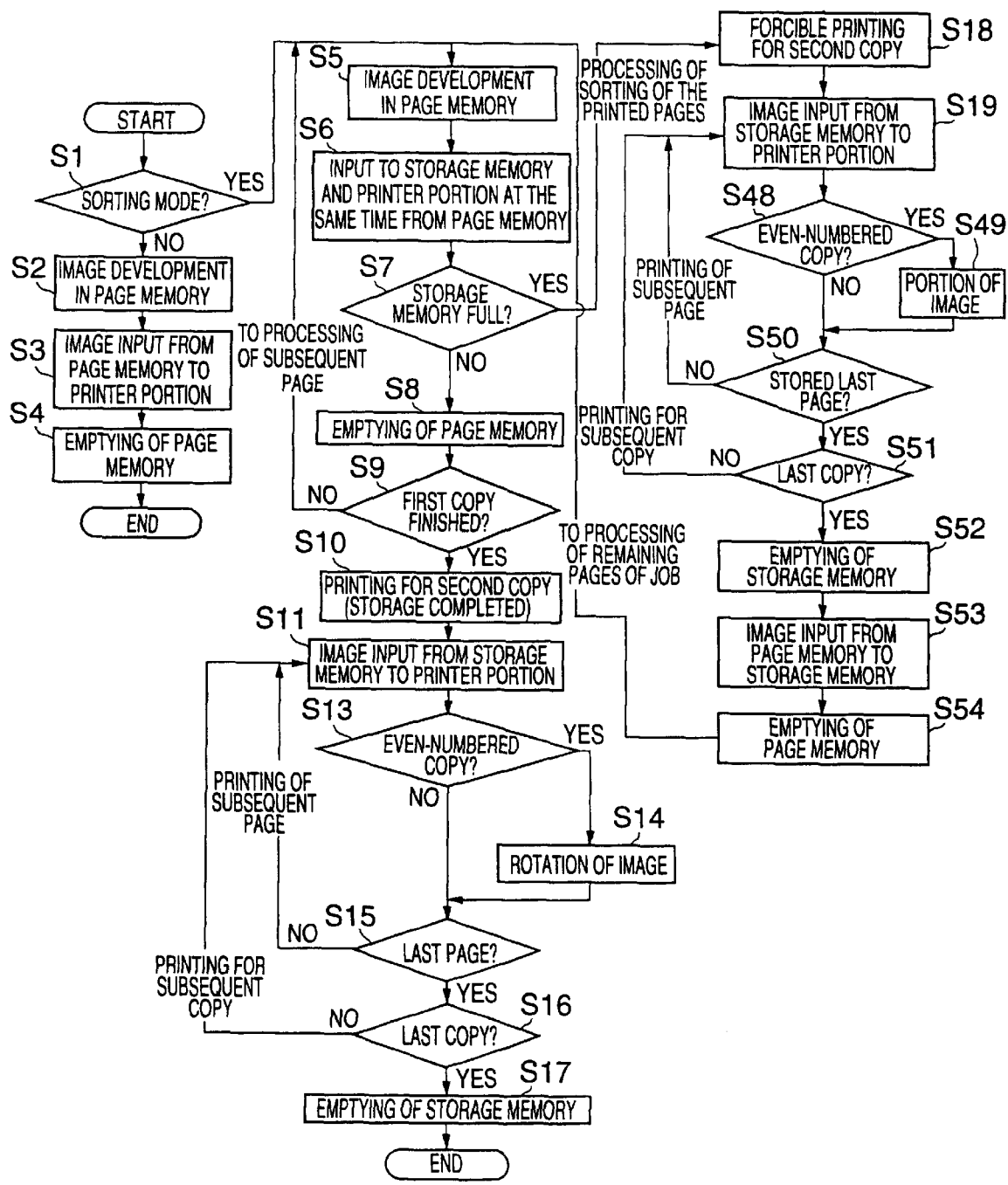
FIG. 15 is a flow chart illustrating a flow of operation in a sixth example performed in the printer apparatus in the first embodiment of the present invention.

FIG. 15 is a flow chart illustrating a flow of operation in a sixth example performed in the printer apparatus 100 in the first embodiment of the present invention. An operation flow in a case where the sorting mode has not been set and an operation flow in a case where the storage memory 36 does not become full during storage of image data for a first copy are the same as those shown in FIG. 5. In the flow shown in FIG. 15, when it has been determined in a step S7 that the storage memory 36 has become full (Yes in the step S7), that is, when the storage memory 36 has become full during storage of the image data for the first copy, the image data stored in the storage memory 36 is decompressed by the image decompressing portion 37 in sequence from the first page, and is input to the printer portion 34 (in a step S19). Then, it is determined (in a step S48) whether or not the current printing processing is for an even-numbered copy (second copy, fourth copy, sixth copy, . . . ). When the current printing processing is for an even-numbered copy, the image data from the image decompressing portion 37 is rotated (in a step S49), and is input to the printer portion 34. When the current printing processing is not for an even-numbered copy, the image data from the image decompressing portion 37 is not rotated, and is input to the printer portion 34. Then, when printing-out processing of all the pages of the image data stored in the storage memory 36 has been completed (Yes in a step S50), and, also, when printing-out processing for a specified number of copies has been completed (Yes in a step S51), the storage memory 36 is emptied (in a step S52). Then, the image data, stored in the page memory 32, of the page processed at the time the storage memory 36 became full is input to the storage memory 36 and is stored therein (in a step S53). Then, the page memory 32 is emptied (in a step S54), and, then, processing starting from a step S5 is started. A flow of following operation is the same as that shown in FIG. 5.

Figure 16:
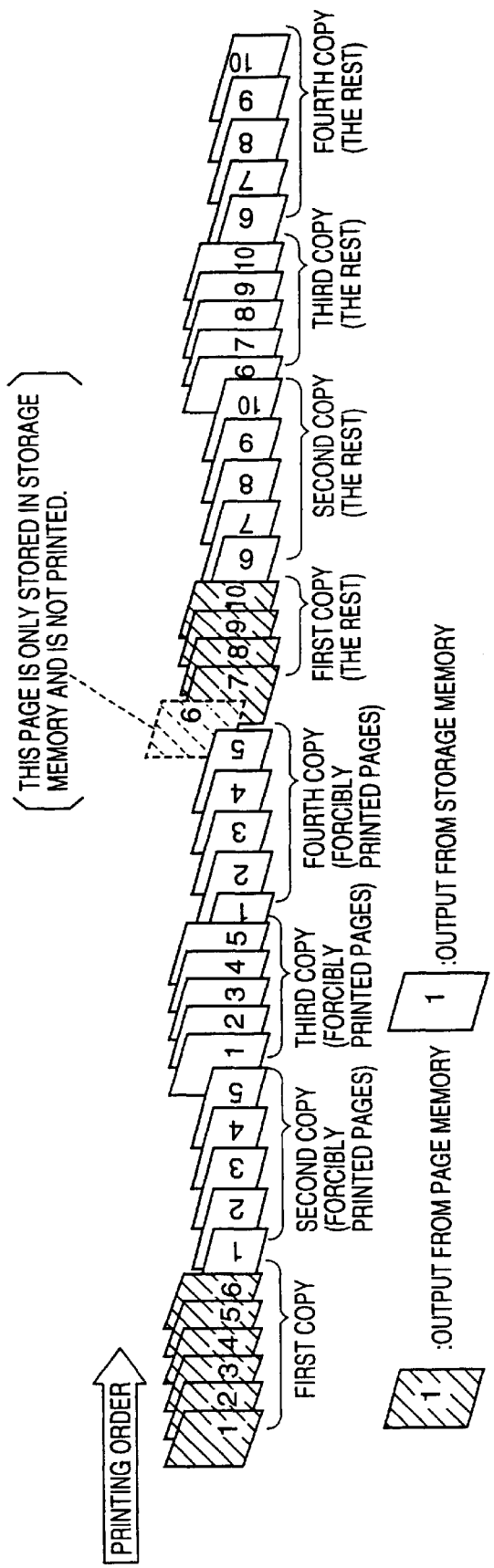
FIG. 16 shows an example of an output result of the operation in accordance with the flow shown in FIG. 15.

Thus, when the storage memory 36 has become full, after the printing out of the pages of image data which are stored in the storage memory 36 is performed for the necessary number of copies (the forcible printing for the copies subsequent to the first copy) after the printing out for the first copy, the image data, which data is read from the page memory 32, and on which data the image rotating processing cannot be performed, is transferred from the page memory 32 to and stored in the storage memory 36. Then, when the remaining pages of image data are printed out, the page of image data, thus transferred from the page memory 32 to and stored in the storage memory 36, is printed out at the time of printing out of the remaining pages for each of the copies subsequent to the first copy. Thereby, when document data consisting of 10 pages is attempted to be printed out so as to obtain four copies of the document data using the rotation sorting, in a case where the storage memory 36 becomes full before storage of the image data of the sixth page in the storage memory 36 is finished, an output result shown in FIG. 16 is obtained. In this case, although the number (6) of pages printed for the first copy before the foricble printing is different, by one, from the number (5) of pages forcibly printed for each of the copies subsequent to the first copy, sorting for the respective copies can be performed only by laying the incomplete set of pages of the first copy on top of the remaining pages of the first copy, the incomplete set of pages of the second copy on top of the remaining pages of the second copy, .... Thereby, it is possible to further reduce a sorting work by human hands.

Figure 17:
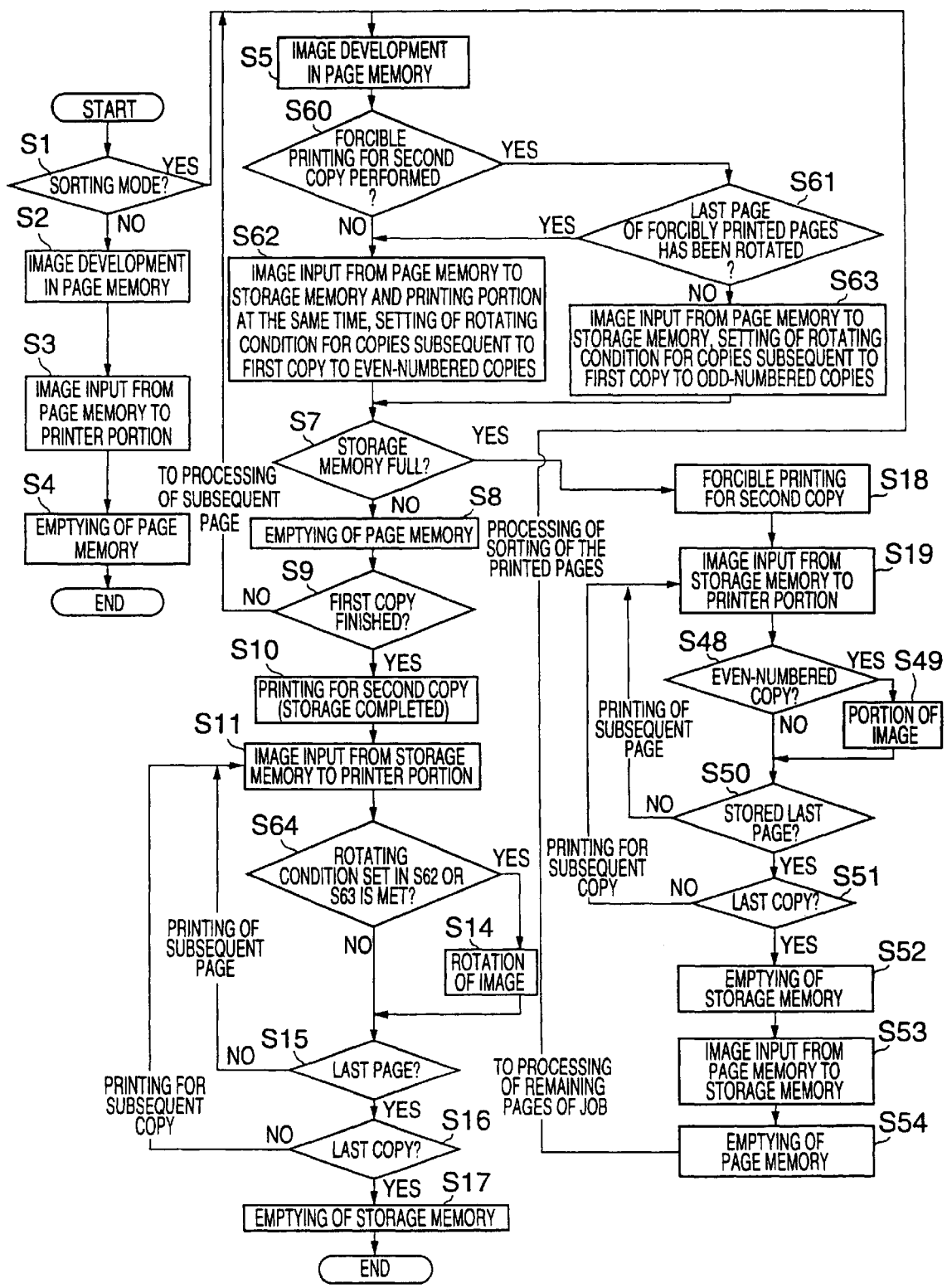
FIG. 17 is a flow chart illustrating a flow of operation in a seventh example performed in the printer apparatus in the first embodiment of the present invention.

FIG. 17 is a flow chart illustrating a flow of operation in a seventh example performed in the printer apparatus 100 in the first embodiment of the present invention. An operation flow in a case where the sorting mode has not been set is the same as that shown in FIG. 5. In the flow shown in FIG. 17, after data received from the host computer 200 is developed in the page memory 32 in a step S5, it is determined (in a step S60) whether forcible printing for copies subsequent to a first copy has been performed. When the forcible printing for the copies subsequent to the first copy has not been performed (No in the step S60), the image data developed in the page memory 32 is transferred to the printer portion 34 and storage memory 36 at the same time via the distribution/switching portion 33, and, also, an image-rotating condition is set to be that printing is performed for each even-numbered copy of copies subsequent to a first copy so that the image rotating processing is performed on the image data to be printed out for each even-numbered copy of the copies subsequent to the first copy (in a step S62). When the forcible printing for the copies subsequent to the first copy has been performed (Yes in the step S60), it is determined (in a step S61) whether or not the last page of the forcibly printed pages has been rotated. When the last page of the forcibly printed pages has been rotated (Yes in the step S61), the step S62 is performed. When the last page of the forcibly printed pages has not been rotated (No in the step S61), the image data developed in the page memory 32 is transferred only to the storage memory 36 via the distribution/switching portion 33 and it stored there, and, also, an image-rotating condition is set to be that printing is performed for each odd-numbered copy of copies subsequent to a first copy so that the image rotating processing is performed on the image data to be printed out for each odd-numbered copy of the copies subsequent to the first copy (in a step S63). That is, it is determined whether or not the sheet (sheet of the last page of the forcibly printed pages) on which printing has been performed immediately before printing for the first copy following the forcible printing is performed has been rotated. When this sheet has been rotated, setting is performed such that printing is performed in accordance with the normal rotating condition, that is the rotating processing is performed for each even-numbered copy. However, when this sheet has not been rotated, setting is performed such that printing is performed in accordance with the rotating condition different from the normal rotating condition, that is the rotating processing is performed for each odd-numbered copy including the first copy.

Then, it is monitored whether or not the storage memory 36 has become full (the storage memory 36 has been filled with data to capacity) (in a step S7). When the storage memory 36 has not become full (No in the step S7), the page memory 32 is emptied (in a step S8), processing starting from a step S5 is repeated. Then, when the storage processing and printing-out processing for the first copy is finished without the storage memory 36 becoming full (Yes in a step S9), the storage processing to the storage memory 36 is completed at the same time, and printing-out processing for copies subsequent to the first copy is started (in a step S10).

In the printing-out processing for the copies subsequent to the first copy, the image data stored in the storage memory 36 is decompressed by the image decompressing portion 37 in sequence from the first page, and is input to the printing portion 34 (in a step S11). Then, it is determined (in a step S64) whether or not the current printing processing meets the rotating condition set in either the step S62 or the step S63. When the current printing processing meets the rotating condition (Yes in the step S64), the image data from the image decompressing portion 37 is rotated (in a step S14), and is input to the printer portion 34. When the current printing processing does not meet the rotating condition (No in the step S64), the image data from the image decompressing portion 37 is not rotated, and is input to the printer portion 34. Then, when printing-out processing of the last page has been finished (Yes in a step S15), printing-out processing for the subsequent copy is started, and the above-mentioned series of processing (S11, S64, S15) is repeated. Then, when printing-out processing for a specified number of copies has been completed (Yes in a step S16), the storage memory 36 is emptied (in a step S17), and the printing-out processing is finished.

On the other hand, when it has been determined in the step S7 that the storage memory 36 has become full (Yes in the step S7), that is, when the storage memory 36 has become full during storage of the image data for the first copy, the image data stored in the storage memory 36 is decompressed by the image decompressing portion 37 in sequence from the first page, is input to the printer portion 34 and is printed out (in a step S19). Then, it is determined (in a step S48) whether or not the current printing processing is for an even-numbered copy (second copy, fourth copy, sixth copy, ... ). When the current printing processing is for an even-numbered copy (Yes in the step S48), the image data from the image decompressing portion 37 is rotated (in a step S49), and is input to the printer portion 34. When the current printing processing is not for an even-numbered copy (No in the step S48), the image data from the image decompressing portion 37 is not rotated, and is input to the printer portion 34. Then, when printing-out processing of the last page of the image data stored in the storage memory 36 has been completed (Yes in a step S50), and, also, when printing-out processing for a specified number of copies has been completed (Yes in a step S51), the storage memory 36 is emptied (in a step S52). Then, the image data, stored in the page memory 32, of the page processed at the time the storage memory 36 became full is input to the storage memory 36 and is stored therein (in a step S53). Then, the page memory 32 is emptied (in a step S54), and, then, processing starting from a step S5 is started.

Figure 18:
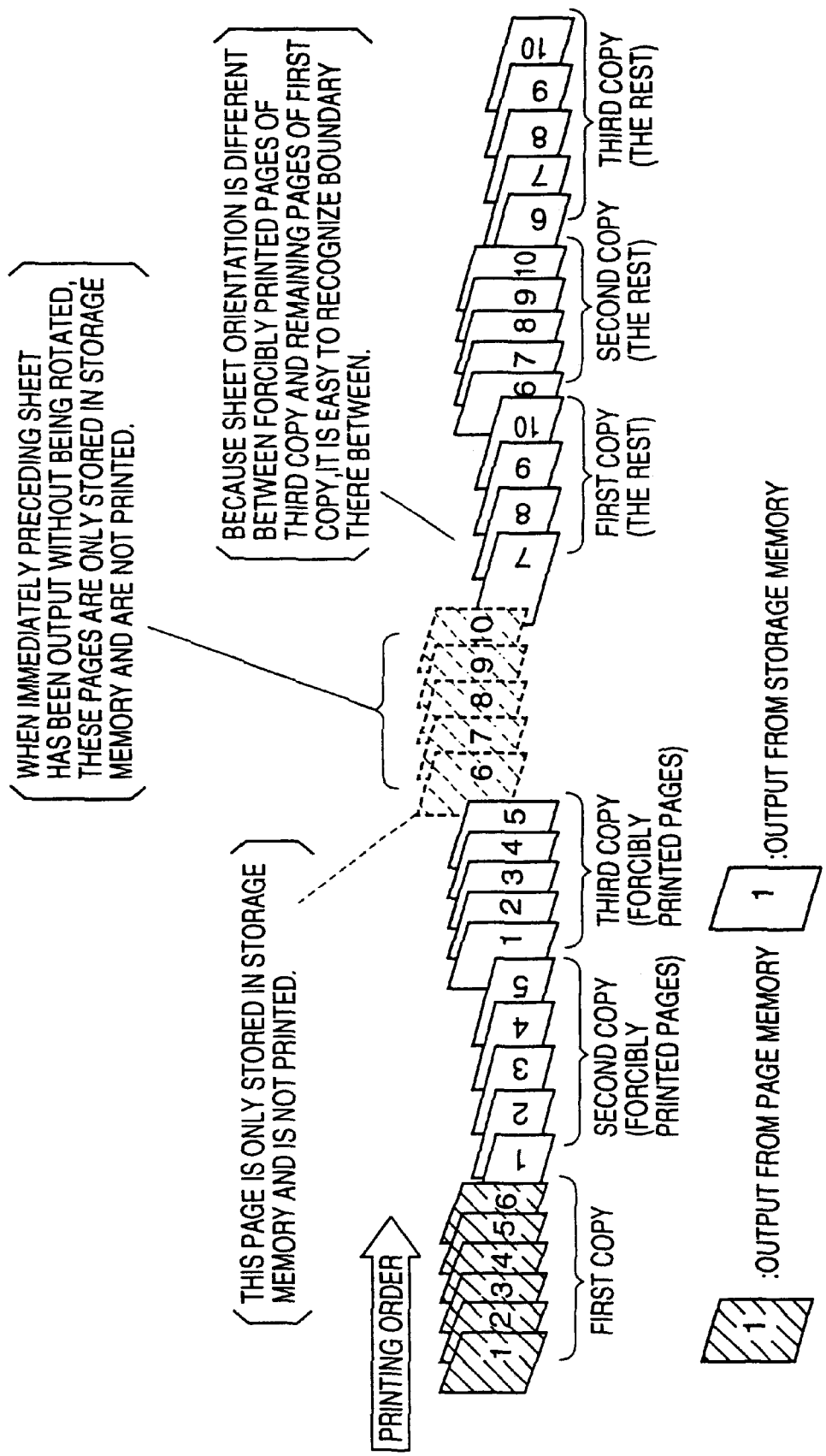
FIG. 18 shows an example of an output result of the operation in accordance with the flow shown in FIG. 17.

Thus, when the storage memory 36 has become full, after the printing out of the pages of image data which are stored in the storage memory 36 is performed for the necessary number of copies after the printing out for the first copy, it is determined whether the last page of the thus-printed-out pages has been rotated. When the last page of the printed-out pages has not been rotated, the image data of the remaining pages for the first copy is rotated, and, then, in response thereto, the image data of the remaining pages for the copies subsequent to the first copy is rotated or is not rotated in copy units alternately, that is, the image data of the remaining pages for the second copy is not rotated, the image data of the remaining pages for the third copy is rotated, the image data of the remaining pages for the fourth copy is not rotated, .... Thereby, when document data consisting of 10 pages is attempted to be printed out so as to form four copies of the document data using the rotation sorting, in a case where the storage memory 36 becomes full before storage of the image data of the sixth page in the storage memory 36 is finished, an output result shown in FIG. 18 is obtained. In the operation shown in FIG. 15, in a case where, for example, printing is performed for an odd-numbered copies (for example, 3 copies), the orientation of the sheets of the last copy (third copy in this example) of copies obtained through forcible printing performed for the copies subsequent to the first copy becomes the same as the orientation of the sheets of the following first copy of the remaining pages. As a result, it is not easy to determine the boundary therebetween. However, by determining whether or not the last page of pages printed out through forcible printing has been rotated, and, printing out the remaining pages after rotating or not rotating alternately in copy units in accordance with the result of the determination, it is possible to clearly recognize the boundary between the sheets of copies obtained through forcible printing and the sheets of copies of the remaining pages without changing a paper ejection tray. Thereby, it is possible to further reduce a sorting work by human hands.

Figure 19:
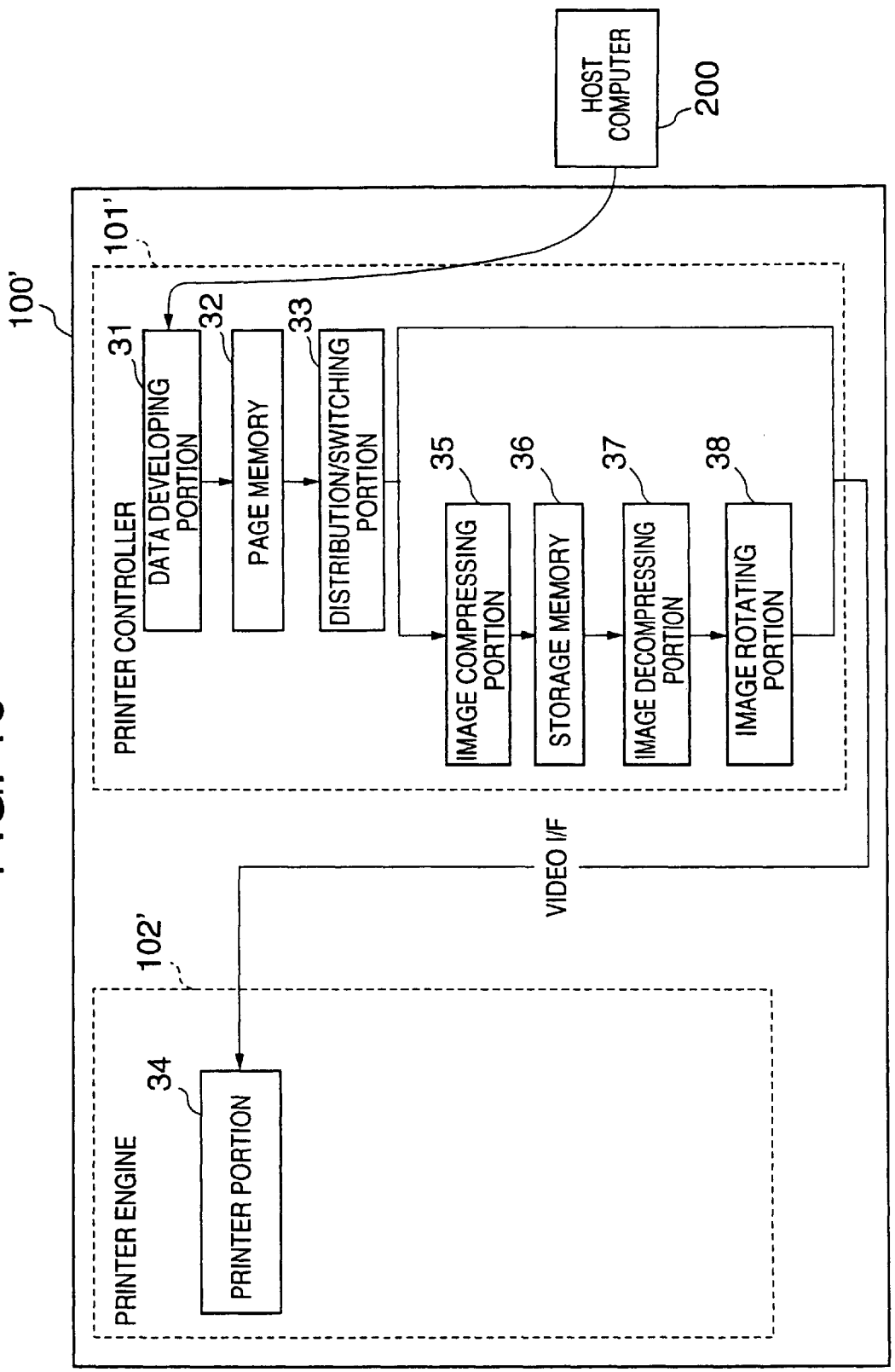
FIG. 19 is a functional block diagram of a variant embodiment of the first embodiment of the present invention.

The functional-block arrangement of the first embodiment of the present invention is not limited to that shown in FIG. 4. It is also possible that the distribution/switching portion 33, image compressing portion 35, storage memory 36, image decompressing portion 37 and image rotating portion 38, provided before the printer portion 34, are provided in the printer controller, as shown in FIG. 19, instead of the printer engine.

A printer apparatus in a second embodiment of the present invention will now be described.

The printer apparatus in the second embodiment has a hardware arrangement the same as that of the first embodiment shown in FIG. 3. A CPU 1 performs operation of the second embodiment. A plurality of page images are stored in a RAM 6. A printer engine 8 transforms print data from a host computer 200 into images, and prints the images on sheets.

Figure 20:
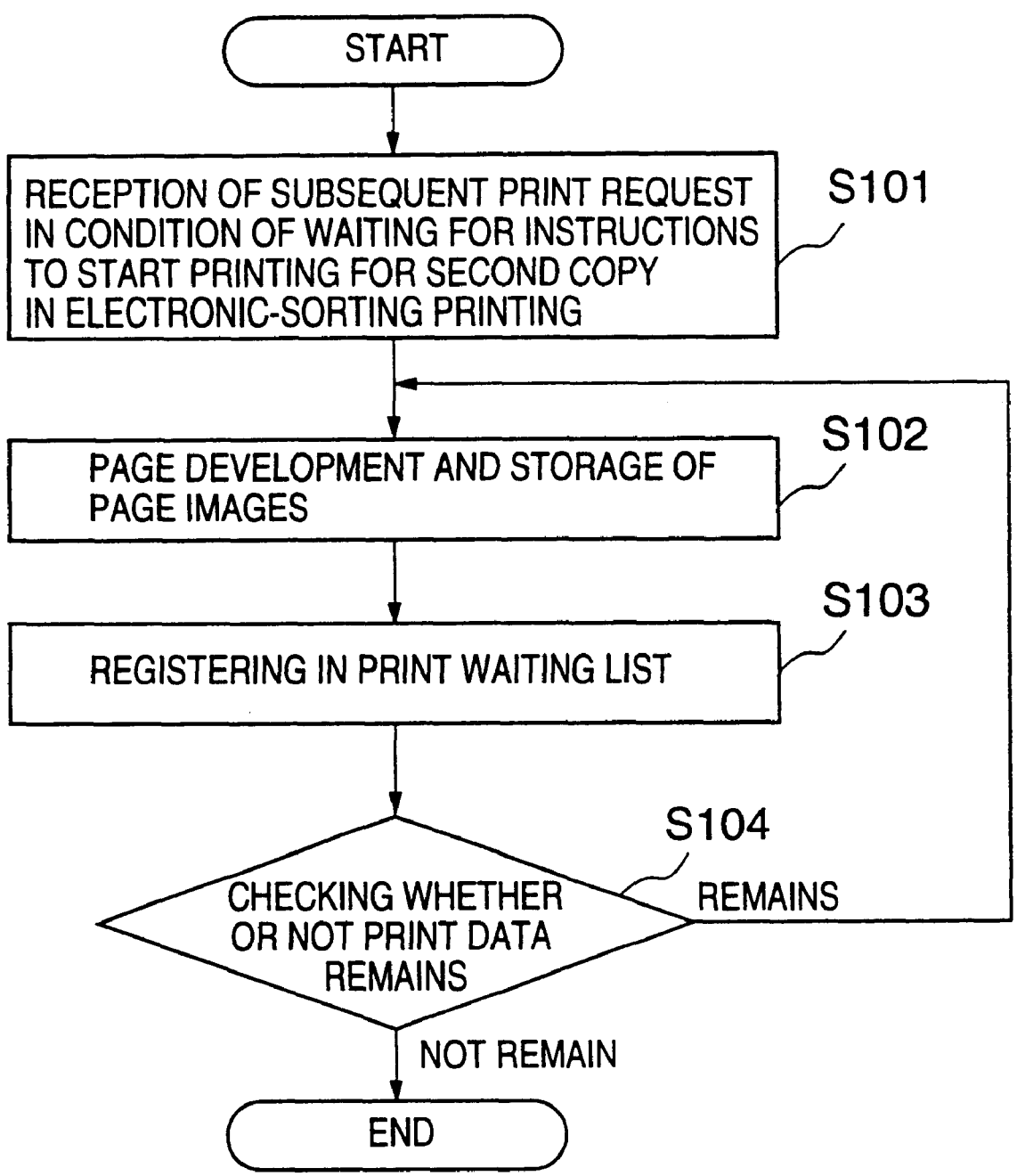
FIG. 20 is a flow chart showing a flow of operation performed in a printer apparatus in a second embodiment of the present invention.

FIG. 20 is a flow chart showing an operation flow of the second embodiment. In FIG. 20, a subsequent print request (second printing job) is received in a condition in which instructions by an operator through an operation panel 10 to start printing for copies subsequent to a first copy in electronic-sorting printing (first printing job) are waited for after printing for the first copy has been performed as test printing (in a step S101). Then, page development of print data is performed for the thus-received print request (second printing job), and the thus-obtained page images are stored in the RAM 6 (in a step S102). Then, page information of the thus-stored page images is registered in a print waiting list (in a step S103). Then, it is determined (in a step S104) whether or not there is remaining print data. When there is remaining print data (Yes in the step S104), the step S102 is performed in order to store the remaining print data in the RAM 6. When there is not remaining print data (No in the step S104), this means that registering of all the print data has been completed, and, therefore, the processing is finished.

Figures 21, 22, 23:
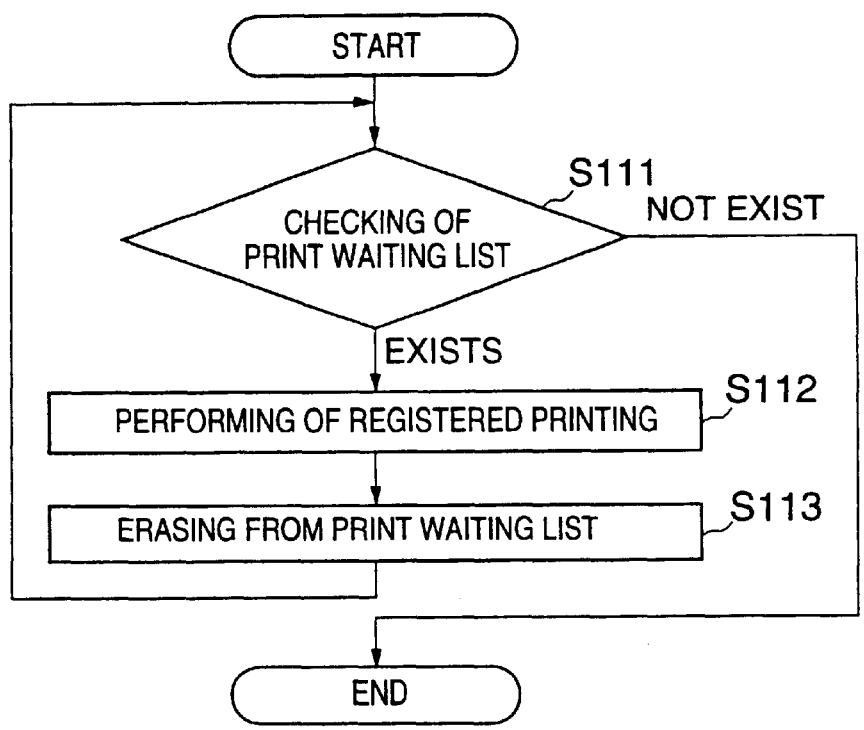
FIG. 21 is a flow chart showing another flow of the operation performed in the printer apparatus in the second embodiment of the present invention.
FIG. 22 shows page information of image data of a print request received and processed by the printer apparatus in the second embodiment of the present invention.
FIG. 23 shows a print waiting list for image data of a print request in the printer apparatus in the second embodiment of the present invention.

FIG. 21 is a flowchart showing another operation flow of the second embodiment. In FIG. 21, when the printing for the copies subsequent to the first copy in the electronic-sorting printing (first printing job), the instructions by the operator to start this printing having been waited for as mentioned above, has been completed, the print waiting list is checked (in a step S111). When there is image data, which has been waiting to be printed out (Yes in the step S111), printing of the registered image data is performed in accordance with the registered page information (in a step S112). Then, the image data is erased from the print waiting list (in a step S113). Then, in order to check the print waiting list again, the step S111 is performed. When there is no image data, which has been waiting to be printed out, as a result of the print waiting list being checked (No in the step S111), the processing is finished.

FIG. 22 shows the page information of image data of a print request received and processed by the second embodiment. In FIG. 22, as the page information of the image data of the print request, a page image number, a paper-feeding tray and a paper-ejecting tray are stored. Accordingly, image data consisting of 10 pages has 10 sets of page information. In the example shown in FIG. 22, the page information only for one page is shown in the figure. In this example, the page image number of this page is 1, the paper-feeding tray to be used for this page is a tray 2, and the paper-ejecting tray to be used for this page is a tray 1.

FIG. 23 shows the print waiting list for image data of a print request in the printer apparatus in the second embodiment. FIG. 23 shows that page information 1 appears as the first entry, page information 2 appears as the second entry, . . . , page information n appears as the n-th entry. Accordingly, when image data of a print request consists of 5 pages, page information 1 through 5 is stored in the print waiting list.

Figure 24:
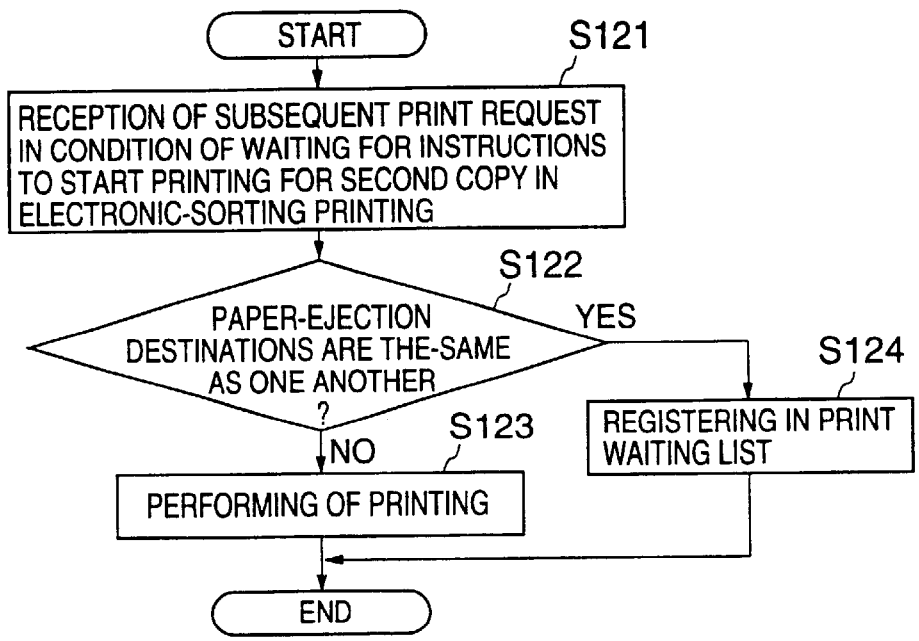
FIG. 24 is a flow chart showing another flow of the operation performed in the printer apparatus in the second embodiment of the present invention.

FIG. 24 is a flow chart showing another operation flow of the second embodiment. In FIG. 24, a subsequent print request (second printing job) is received in a condition in which instructions by an operator through the operation panel 10 to start printing for copies subsequent to a first copy in electronic-sorting printing (first printing job) are waited for after printing for the first copy has been performed as test printing (in a step S121). Then, it is determined (in a step S122) whether or not a paper-ejection destination (paper-ejection tray) of the thus-received print request (second printing job) is the same as a paper-ejection destination (paper-ejection tray) of the printing for the copies subsequent to the first copy in the electronic-sorting printing (first printing job), the instructions by the operator to start this printing having been waited for as mentioned above. When the paper-ejection destination of the thus-received subsequent print request (second printing job) is the same as the paper-ejection destination of the printing for the copies subsequent to the first copy in the electronic-sorting printing (first printing job), the instructions by the operator to start this printing having been waited for as mentioned above (Yes in the step S122), the received subsequent print request (second printing job) is registered in the print waiting list (in a step S124), and the processing is finished. When the paper-ejection destination of the thus-received subsequent print request (second printing job) is not the same as the paper-ejection destination of the printing for the copies subsequent to the first copy in the electronic-sorting printing (first printing job), the instructions by the operator to start this printing having been waited for as mentioned above (No in the step S122), printing of the received subsequent print request (second printing job) is performed (in a step S123), and the processing is finished.

Figure 25:
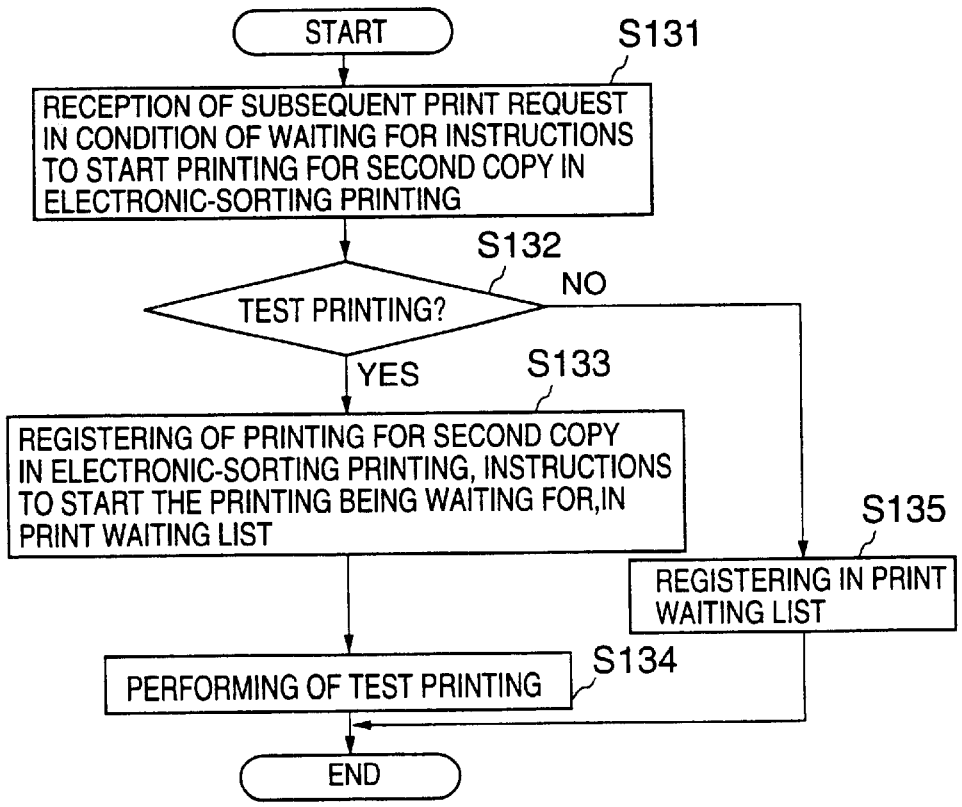
FIG. 25 is a flow chart showing another flow of the operation performed in the printer apparatus in the second embodiment of the present invention.

FIG. 25 is a flow chart showing another operation flow of the second embodiment. In FIG. 25, a subsequent print request (second printing job) is received in a condition in which instructions by an operator through the control panel 10 to start printing for copies subsequent to a first copy in electronic-sorting printing (first printing job) are waited for after printing for the first copy has been performed as test printing (in a step S131). Then, it is determined (in a step S132) whether or not the thus-received subsequent print request (second printing job) is for test printing. When the thus-received subsequent print request (second printing job) is for test printing (Yes in the step S132), the printing for the copies subsequent to the first copy in the electronic-sorting printing (first printing job), the instructions by the operator to start this printing having been waited for as mentioned above, is registered in the print waiting list (in a step S133), the test printing of the received subsequent print request (second printing job) is performed (in a step S134), and the processing is finished. When the thus-received subsequent print request (second printing job) is not for test printing (No in the step S132), the received subsequent print request (second printing job) is registered in the print waiting list (in a step S135), and the processing is finished.

It is possible to provide a selection switch on the operation panel 10 for an operator to select whether or not the above-mentioned function of performing test printing of a subsequent print request (second printing job) in a case where the subsequent print request has been received in a condition in which instructions by an operator through the control panel 10 to start printing for copies subsequent to a first copy in electronic-sorting printing (first printing job) are waited for after printing for the first copy has been performed as test printing is effected.

Further, the present invention is not limited to the above-described embodiments and variations and modifications may be made without departing from the scope of the present invention.

The present application is based on Japanese priority application Nos. 10-358422 and 10-368517, filed on Dec. 2, 1998 and Dec. 9, 1998, respectively, the entire contents of which are hereby incorporated by reference.

What is claimed is:

1. An image forming apparatus, comprising:
    a data developing portion which develops image data in a predetermined format from input image;
    a page memory which stores therein the image data in a page unit developed by said data developing portion;
    a storage memory which stores therein the image data read from said page memory;
    an image compressing portion which compresses the image data when the image data is input to said storage memory;
    an image decompressing portion which decompresses the compressed image data when the image data is output from said storage memory;
    an image rotating portion which rotates the image data from the image decompressing portion, and, then, outputs the image data; and
    a printer portion which prints an image in accordance with the image data read from said page memory or said storage memory,
    wherein the input image data for a plurality of pages is stored in said storage memory, a reading order of the image data from said storage memory is controlled, and, also, the image data is printed out after being rotated alternately in copy units, so that sorting printing can be performed such that a separation between adjacent copies can be easily determined,
    wherein:
        said apparatus further comprises a distribution/switching portion which transfers the image data read from said page memory to only either one of said storage memory and said printing portion or to both portions; and
        when said storage memory becomes full during processing of printing out of the image data read from said page memory and transferred to both said storage memory and said printing portion at the same time for a first copy, the function of said image rotating portion is caused to not be effected for copies subsequent to the first copy, and, also, the pages of image data which are stored in said storage memory are printed out, and the page of image data processed at the time said storage memory became full is transferred from said page memory to said printing portion and is printed out.

2. An image forming apparatus, comprising:
    a data developing portion which develops image data in a predetermined format from input data;
    a page memory which stores therein the image data in a page unit developed by said data developing portion;
    a storage memory which stores therein the image data read from said page memory;
    an image compressing portion which compresses the image data when the image data is input to said storage memory;
    an image decompressing portion which decompresses the compressed image data when the image data is output from said storage memory;
    an image rotating portion which rotates the image data from the image decompressing portion, and, then, outputs the image data; and
    a printer portion which prints an image in accordance with the image data read from said page memory or said storage memory,
    wherein the input image data for a plurality of pages is stored in said storage memory, a reading order of the image data from said storage memory is controlled, and, also, the image data is printed out after being rotated alternately in copy units, so that sorting printing can be performed such that a separation between adjacent copies can be easily determined,
    wherein:
        said apparatus further comprises a distribution/switching portion which transfers the image data read from said page memory to only either one of said storage memory and said printing portion or to both portions; and
        when said storage memory becomes full during processing of printing out of the image data read from said page memory and transferred to both said storage memory and said printing portion at the same time for a first copy, the page of image data processed at the time said storage memory became full is transferred from said page memory to said printing portion and is printed out for necessary copies after printing out for the first copy is finished, and, then, the image data stored in said storage memory is used to be printed out for copies subsequent to the first copy.

3. An image forming apparatus, comprising:
    a data developing portion which develops image data in a predetermined format from input data;
    a page memory which stores therein the image data in a page unit developed by said data developing portion;
    a storage memory which stores therein the image data read from said page memory;
    an image compressing portion which compresses the image data when the image data is input to said storage memory;
    an image decompressing portion which decompresses the compressed image data when the image data is output from said storage memory;
    an image rotating portion which rotates the image data from the image decompressing portion, and, then, outputs the image data; and a printer portion which prints an image in accordance with the image data read from said page memory or said storage memory, wherein the input image data for a plurality of pages is stored in said storage memory, a reading order of the image data from said storage memory is controlled, and, also, the image data is printed out after being rotated alternately in copy units, so that sorting printing can be performed such that a separation between adjacent copies can be easily determined, wherein:
said apparatus further comprises a distribution/switching portion which transfers the image data read from said page memory to only either one of said storage memory and said printing portion or to both portions, and a plurality of paper-ejection trays; and when said storage memory becomes full during processing of printing out of the image data read from said page memory and transferred to both said storage memory and said printing portion at the same time for a first copy, the page of image data processed at the time said storage memory became full is transferred from said page memory to said printing portion and printed out on sheets which are ejected to one of said plurality of paper-ejection trays, and the image data stored in said storage memory is used to be printed out for copies subsequent to the first copy on sheets which are ejected to another one of said plurality of paper-ejection trays.

4. An image forming apparatus, comprising:
a data developing portion which develops image data in a predetermined format from input data;

a page memory which stores therein the image data in a page unit developed by said data developing portion;

a storage memory which stores therein the image data read from said page memory;

an image compressing portion which compresses the image data when the image data is input to said storage memory;

an image decompressing portion which decompresses the compressed image data when the image data is output from said storage memory;

an image rotating portion which rotates the image data from the image decompressing portion, and, then, outputs the image data; and a printer portion which prints an image in accordance with the image data read from said page memory or said storage memory, wherein the input image data for a plurality of pages is stored in said storage memory, a reading order of the image data from said storage memory is controlled, and, also, the image data is printed out after being rotated alternately in copy units, so that sorting printing can be performed such that a separation between adjacent copies can be easily determined, wherein:
said apparatus further comprises a distribution/switching portion which transfers the image data read from said page memory to only either one of said storage memory and said printing portion or to both portions; and when said storage memory becomes full during processing of printing out of the image data read from said page memory and transferred to both said storage memory and said printing portion at the same time for a first copy, all the pages of image data which are stored in said storage memory are rotated and printed out, and the page of image data processed at the time said storage memory became full is transferred from said page memory to said printing portion and printed out, for copies subsequent to the first copy.

5. The image forming apparatus as claimed in claim 4, further comprising a plurality of paper-ejection trays, wherein sheets on which are printed, respectively, pages of image data from a first page of image data through a page of image data processed at the time said storage memory became full are ejected to one of said plurality of paper-ejection trays, and sheets on which subsequent pages of image data are respectively printed are ejected to another one of said plurality of paper-ejection trays.

6. An image forming apparatus, comprising:
a data developing portion which develops image data in a predetermined format from input data;

a page memory which stores therein the image data in a page unit developed by said data developing portion;

a storage memory which stores therein the image data read from said page memory;

an image compressing portion which compresses the image data when the image data is input to said storage memory;

an image decompressing portion which decompresses the compressed image data when the image data is output from said storage memory;

an image rotating portion which rotates the image data from the image decompressing portion, and, then, outputs the image data; and a printer portion which prints an image in accordance with the image data read from said page memory or said storage memory, wherein the input image data for a plurality of pages is stored in said storage memory, a reading order of the image data from said storage memory is controlled, and, also, the image data is printed out after being rotated alternately in copy units, so that sorting printing can be performed such that a separation between adjacent copies can be easily determined, wherein:
said apparatus further comprises a distribution/switching portion which transfers the image data read from said page memory to only either one of said storage memory and said printing portion or to both portions; and when said storage memory becomes full during processing of printing out of the image data read from said page memory and transferred to both said storage memory and said printing portion at the same time for a first copy, the pages of image data which are stored in said storage memory are printed out for a necessary number of copies after printing out for the first copy is finished, and, then, the page of image data processed at the time said storage memory became full is transferred from said page memory to said storage memory and stored there, and is printed out when remaining pages of image data are printed out for copies subsequent to the first copy.

7. The image forming apparatus as claimed in claim 6, wherein, after the pages of image data which are stored in said storage memory are printed out for the necessary number of copies after printing out for the first copy is finished, it is determined whether or not the last page of the thus-printed pages has been rotated, and, when the last page of the thus-printed pages has not been rotated, the remaining pages of image data are rotated and printed out for the first copy, and, in response thereto, the remaining pages of image data are rotated or are not rotated and are printed out for each of copies subsequent to the first copy so that rotation and non-rotation of the remaining pages of image data are alternately performed for the copies including the first copy in copy units.

* * * * *